(12) United States Patent
Ji et al.

(10) Patent No.: US 7,274,697 B2
(45) Date of Patent: *Sep. 25, 2007

(54) FAST IP ROUTE LOOKUP WITH 16/K AND 16/KC COMPRESSED DATA STRUCTURES

(75) Inventors: Hongbin Ji, San Jose, CA (US); Michael Carchia, Santa Clara, CA (US)

(73) Assignee: Tensilica, Inc., Santa Clara, CA (US)

( * ) Notice: Subject to any disclaimer, the term of this patent is extended or adjusted under 35 U.S.C. 154(b) by 1073 days.

This patent is subject to a terminal disclaimer.

(21) Appl. No.: 10/032,379

(22) Filed: Dec. 21, 2001

(65) Prior Publication Data

US 2002/0172203 A1    Nov. 21, 2002

Related U.S. Application Data

(60) Provisional application No. 60/264,667, filed on Jan. 25, 2001.

(51) Int. Cl.
*G06F 12/00* (2006.01)
*H04L 12/28* (2006.01)

(52) U.S. Cl. ..................... 370/392; 711/118
(58) Field of Classification Search ........ 370/389–392, 370/412, 428, 429, 472, 474; 709/238, 245; 369/272.1; 711/1, 3, 108, 111, 113, 117, 711/118, 122

See application file for complete search history.

(56) References Cited

U.S. PATENT DOCUMENTS 5,951,651 A    9/1999  Lakshman et al.
6,018,524 A *  1/2000  Turner et al. ............... 370/392
6,141,738 A * 10/2000  Munter et al. .............. 711/206
6,243,720 B1 * 6/2001  Munter et al. .............. 707/206
6,341,130 B1   1/2002  Lakshman et al.
6,434,144 B1 * 8/2002  Romanov ................... 370/392
6,563,823 B1 * 5/2003  Przygienda et al. ........ 370/392
6,571,313 B1 * 5/2003  Filippi et al. ............... 711/108
6,631,419 B1 * 10/2003 Greene ....................... 709/238
6,658,482 B1 * 12/2003 Chen et al. ................. 709/245

(Continued)

OTHER PUBLICATIONS

Gupta et al., "Routing Lookups in Hardware at Memory Access Speeds," IEEE, 1998, pp. 1240-1246.*

(Continued)

*Primary Examiner*—Doris H. To
*Assistant Examiner*—Kerri M. Rose
(74) *Attorney, Agent, or Firm*—Pillsbury Winthrop et al

(57) ABSTRACT

An advanced data structure allows lookup based upon the most significant 16 bits and the following variable number of K bits of the IP destination address. This 16/K scheme requires less than 2 MB memory to store the whole routing tables of present day backbone routers. A 16/Kc version utilizes bitmaps to compress the table to less than 0.5 MB. For the 16/K data structure each route lookup requires at most 2 memory accesses while the 16/Kc requires at most 3 memory accesses. By configuring the processor properly and developing a few customized instructions to accelerate route lookup, one can achieve 85 million lookups per second (MLPS) in the typical case with the processor running at 200 MHz. Further, the lookup method can be implemented using pipelining techniques to perform three lookups for three incoming packets simultaneously. Using such techniques, 100 MLPS performance can be achieved.

6 Claims, 17 Drawing Sheets

U.S. PATENT DOCUMENTS

| | | | |
|---|---|---|---|
| 6,697,363 B1* | 2/2004 | Carr | 370/389 |
| 6,717,946 B1 | 4/2004 | Hariguchi et al. | |
| 6,782,382 B2* | 8/2004 | Lunteren | 707/3 |
| 6,798,777 B1* | 9/2004 | Ferguson et al. | 370/392 |
| 6,963,924 B1* | 11/2005 | Huang et al. | 709/238 |
| 6,970,462 B1 | 11/2005 | McRae | |
| 6,975,631 B1* | 12/2005 | Kastenholz | 370/401 |
| 6,980,552 B1 | 12/2005 | Belz et al. | |
| 2002/0002549 A1* | 1/2002 | Lunteren | 707/2 |
| 2002/0080798 A1* | 6/2002 | Hariguchi et al. | 370/395.31 |
| 2002/0118682 A1* | 8/2002 | Choe | 370/395.31 |
| 2006/0039374 A1 | 2/2006 | Belz et al. | |

OTHER PUBLICATIONS

Chiueh et al., "High-Performance IP Routing Table Lookup Using CPU Caching," IEEE, 1999, pp. 1421-1427.*

Degermark et al., "Small Forwarding Tables for Fast Routing Lookups," ACM, 1997, pp. 3-13.*

Srinivsan et al., "Fast Address Lookups Using Controlled Prefix Expansion," pp. 1-37.*

Huang et al., "A Novel IP-Routing Lookup Scheme and Hardware Architecture for Multigigabit Switching Routers," IEEE Journal on Selected Areas in Communications, vol. 17, No. 6, Jun. 1999, pp. 1093-1104.*

Srinivasan, V. et al., "Fast Address Lookups Using Controlled Prefix Expansion", White paper, p. 1-37.

\* cited by examiner

Route update comes in sequence: 128/8/1

|   | NH/PL/Pointer |
|---|---|
|   |   |
| 0 | 1/8 |
| . |   |
| . |   |
| 0 | 1/8 |
|   |   |
|   |   |
| 0 | 1/8 |
|   |   |
|   |   |

T1_RIB

FIG. 6A

Route update comes in sequence: 128.3/16/2

| | | NH/PL/Pointer |
|---|---|---|
| 128.0 | | |
| | | |
| | | |
| | | |
| 128.3 | 01 | ~~1/8~~ 2/16 |
| | | |
| | | |
| 128.255 | | |
| | | |
| | | |

T1_RIB

FIG. 6C

Route update comes in sequence: 128.3/16/2

FAST IP ROUTE LOOKUP WITH 16/K AND 16/KC COMPRESSED DATA STRUCTURES

CROSS-REFERENCE TO RELATED APPLICATION

This application is related to and claims priority to U.S. Provisional Patent Application No. 60/264,667 filed on Jan. 25, 2001, the contents of which are incorporated herein by reference.

BACKGROUND OF THE INVENTION

1. Field of the Invention

The present invention is directed to communication networks and, more particularly, to routing messages in communication networks.

2. Background of the Related Art

Since the 1990s the Internet has grown substantially in terms of the continuously increasing amount of traffic and number of IP routers and hosts on the network. One of the major functions of IP routers is packet forwarding, which is basically doing a routing table lookup based on an IP destination field in an IP packet header of an incoming packet and identifying a next hop over which the incoming packet should be sent.

Primarily, three approaches have been used for IP route lookup—pure software, pure hardware and a combination of software and hardware. In early-generation routers where line card interfaces were running at low speed, appropriately programmed general-purpose processors were typically used to perform packet forwarding. This is a pure software approach. Its main advantages are that it is flexible, easy to change and easy to upgrade. Its main disadvantages are its poor performance, low efficiency and difficulty in being scaled to high-speed interfaces.

In later-generation routers where speed and performance are critical, the pure hardware approach is taken. Here, customized application-specific integrated circuit (ASIC) hardware is developed to achieve very high performance and efficiency. The main disadvantages of this approach are that it is hard to change or upgrade to accommodate new features or protocols, it is too expensive to develop, and it has a long development cycle—typically, about 18 months.

In the latest generation of routers, a combination software and hardware approach is taken. This is a so-called "network processor", which uses a special processor optimized for network applications instead of a general purpose processor. The advantage of this approach is that the network processor is programmable, flexible, and can achieve performance comparable to that of the customized ASIC. It also shortens the time for product to market, can be easily changed or upgraded to accommodate new features or protocols, and allows customers to change the product to a limited degree.

For the software approach, one study reports that two million lookups per second (MLPS) can be achieved using a Pentium II 233 MHz with 16 KB L1 data cache and 1 MB L2 cache. It requires 120 CPU cycles per lookup with a three level trie data structure (16/8/8). Further, software has been developed which compresses the routing table into a small forwarding table that can be fit into the cache memory of an ordinary PC. This arrangement requires about 100 instructions per lookup and is claimed to be capable of performing 4 MLPS using a Pentium 200 MHz processor.

The hardware approach has been taken by many IP router vendors. For example, Juniper Networks designed an ASIC called the "Internet Processor" which is a centralized forwarding engine using more than one million gates with a capacity of 40 MLPS. The Gigabit Switch Router (GSR) from Cisco Systems is capable of performing 2.5 MLPS per line card (OC48 interface) with distributed forwarding. The whole system can achieve 80 Gb/s switching capacity.

The network processor approach has recently become popular. For example, the XPIF-300 from MMC Networks supports 1.5 million packets processed per second (MPPS) with a 200 MHz processor optimized for packet processing; another product, the nP3400, supports 6.6 MPPS. The IXP1200 network processor from Intel uses one StrongARM microprocessor with six independent 32-bit RISC microengines. The six microengines can forward 3 MPPS. The Prism from Siterra/Vitesse uses four embedded custom RISC cores with modified instruction sets. The C-5 from C-Port/Motorola uses 16 RISC cores to support an interface capable of supporting a communication speed of up to 5 Gb/s. Ranier from IBM uses 16 RISC cores with embedded MAC & POS framers. Agere/Lucent also has developed a fast pattern processor to support speeds up to the OC-48 level.

Traditionally the IPv4 address space is divided into classes A, B and C. Sites with these classes are allowed to have 24, 16 and 8 bits for addressing, respectively. This partition is inflexible and has caused wastes of address space, especially with respect to class B. So, bundles of class C addresses were furnished instead of a single class B address. This has caused substantial growth of routing table entries. A new scheme called classless inter-domain routing (CIDR) was used to reduce the routing table entries by arbitrary aggregation of network addresses. Routing table lookup requires longest prefix matching, which is a much harder problem than exact matching. The most popular data structure for longest prefix matching is the Patricia trie or level compressed trie, which is basically a binary tree with compressed levels. A similar scheme called reduced radix tree has been implemented in Berkeley UNIX 4.3. Content Addressable Memory (CAM) is used for route lookup, but it only supports fixed length patterns and small routing tables. A technique using expanded trie structures with controlled prefix expansion has been introduced for fast route lookup. Another technique uses a bitmap to compress the routing table so that it can fit into a small SRAM and help to achieve a fast lookup speed. In order to add a new route into the table, the update method requires sorting and preprocessing of all existing routes with the new route, which is very expensive computation. In other words, this method does not support incremental route update.

Upon receiving an IP data packet, IP routers need to perform route lookup and find the next hop for the packet. The aforementioned applications give analyses of the backbone routing table traces and also keen observations about the route distribution. This motivates the design of advanced data structures to store the routing information and to accelerate lookup/update while minimizing the memory requirement. For example, a large DRAM memory may be used in an architecture described in the previous applications to store two-level routing tables. The most significant 24 bits of IP destination address are used as an index into the first level, while the remaining eight bits are used as offset into the second table. This is a so-called 24/8 data structure. The data structure requires 32 MB memory for the first level table but much less memory for the second level.

The applications also discuss a compressed data structure called 24/8c that reduces the memory requirement to about 3 MB. The 24/8 and 24/8c data structures need a fixed number of entries (i.e. $2^8$) for each second level table segment.

SUMMARY OF THE INVENTION

This application discloses an advanced data structure that allows lookup based upon the most significant 16 bits and the following K bits of the IP destination address (where K is chosen as discussed herein). This scheme, called 16/K routing, requires less than 2 MB memory to store the whole routing tables of present day backbone routers. It also helps to develop another version of the data structure called 16/Kc routing, which utilizes bitmaps to compress the table to less than 0.5 MB. For the 16/K data structure, each route lookup requires at most 2 memory accesses while the 16/Kc structure requires at most 3 memory accesses. For each individual scheme, the same data structure can be used for both route lookup and update. The data structures also support incremental route update. Lastly, the data structure defined herein can be extended to support multiple next hops, a technique for congestion management and load balancing using equal cost multi-paths.

Cycle-accurate simulation results are reported for a configurable processor implementation. By configuring the processor properly and developing a few customized instructions to accelerate route lookup, one can achieve 85 million lookups per second (MLPS) in a typical case with the processor running at 200 MHz. This performance is much better than 2 MLPS which can typically be achieved by using a general purpose CPU, and is comparable to that of custom ASIC hardware solutions.

The data structures and methods disclosed herein also can be implemented in pure hardware, in which case each route lookup can be designed to have as few as three memory accesses. The routing table can be stored in external SRAM with a typical 10 ns access time. Further, the lookup method can be implemented using pipelining techniques to perform three lookups for three incoming packets simultaneously. Using such techniques, 100 MLPS performance can be achieved.

BRIEF DESCRIPTION OF THE DRAWINGS

These and other aspects of an embodiment of the present invention are better understood by reading the following detailed description of the preferred embodiment, taken in conjunction with the accompanying drawings, in which:

FIGS. 6A-6D show an illustrative example of updating in a 16/K scheme;

DETAILED DESCRIPTION OF PRESENTLY PREFERRED EXEMPLARY EMBODIMENTS

Figure 1:
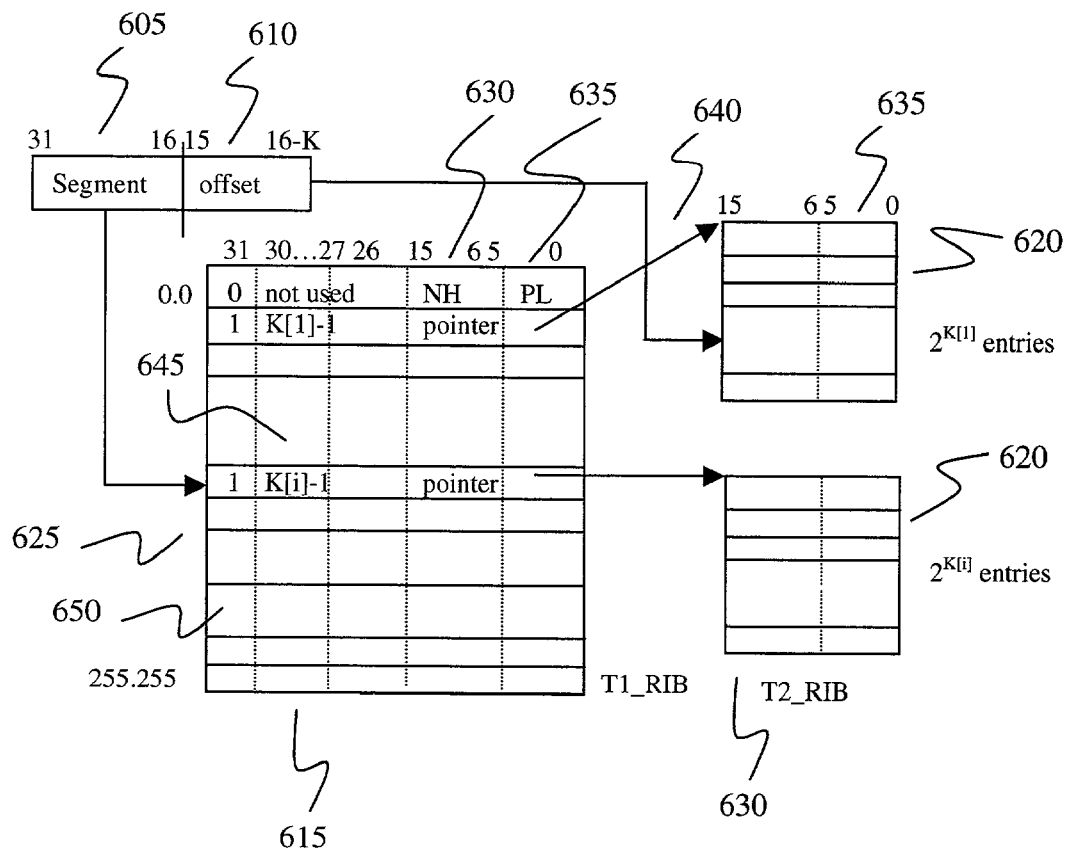
FIG. 1 shows the data structure in a 16/K scheme according to an embodiment of the present invention.

Each IPv4 packet has a layer 3 field containing a 32-bit destination IP address. In the following embodiments, the most significant 16 bits are grouped together and called a segment 605 and the remaining K bits are called an offset 610. K is variable ranging from 1 to 16 and is chosen in order to minimize redundancy in the table. The data structure will have two levels of tables in order to store the routing information base (RIB): namely, T1_RIB (first level) and T2_RIB (second level) tables. FIG. 1 shows the two hierarchical levels for the 16/K data structure. The most significant 16 bits of an IP destination address are used as an index to the T1_RIB table 615. The index to the T1_RIB table 615 ranges from 0.0 (for the first entry 625) to 255.255 (for the last entry 625). Totally the T1_RIB table 615 has 216 entries. Each entry 625 in the T1_RIB table 615 is 4 bytes; thus its total size is 216*4 bytes=256 KB. Each entry 625 in the T1_RIB table 615 stores next hop 630 and prefix length 635 (NHPL) information if there is not any route whose prefix matches the index of that entry 625, with a prefix length 635 greater than 16. If there are one or more routes associated with that entry 625 having a prefix length 635 greater than 16, that entry 625 instead stores a K value 645 and the base address 640 pointing to a T2_RIB table 620 that has 2K entries. For those entries in the T1_RIB table 615 that store base addresses 640 pointing to a T2_RIB table 620, they will use distinct, unique base addresses 640. The remaining K bits are used in the IP destination address as an offset pointing to a particular entry 625 in the T2_RIB table 620. Each entry 625 in the T2_RIB table 620 is two bytes and stores the NHPL information 655 for a route.

Figure 2A:
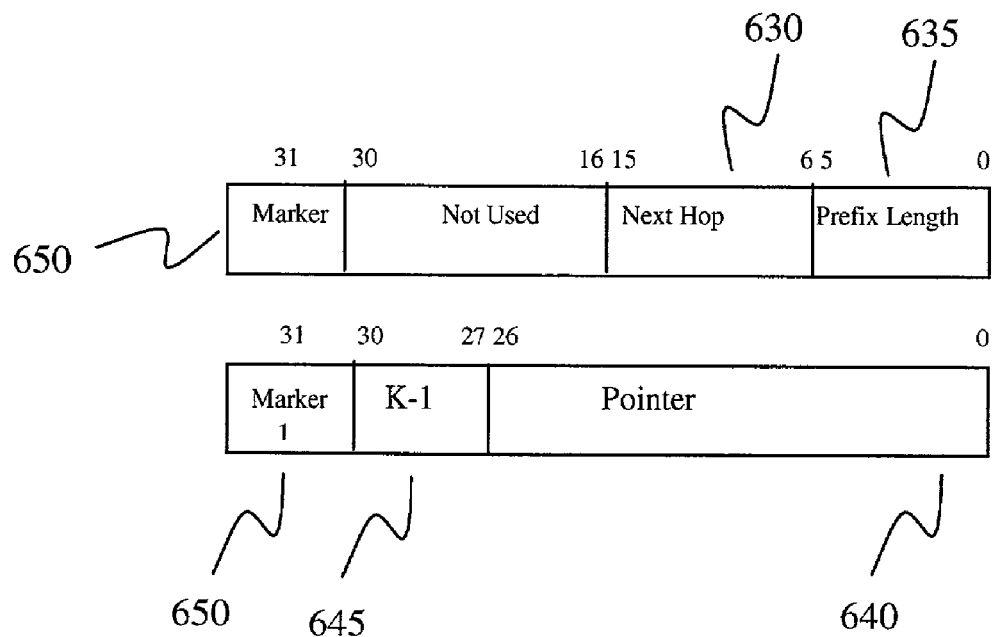
FIGS. 2A and 2B show data structures for next hop/prefix length and K/pointer in this embodiment.
Figure 2B:
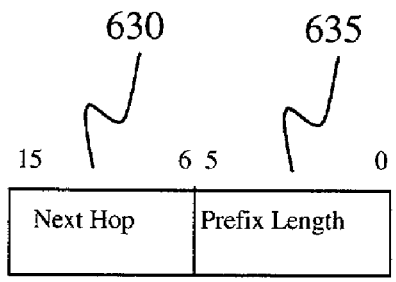

It is necessary to store the prefix length 635 of each route entry 625 for route update. That is, a more specific route will overwrite a less specific route. Suppose the initial route table is empty. If a new IP route 38.0.0.0/8/1 (the first field is the 32-bit IP address in dot format, the second field "8" indicates prefix length 635 while the third field "1" is the next hop 630) arrives. This implies that the T1_RIB table 615 from 38.0 to 38.255 (total 28=256 entries) needs to be updated to reflect this newer route. Next, suppose a new IP route 38.170.0.0/16/2 arrives. The entry 625 indexed by 38.170 in the T1_RIB table 615 are overwritten with the new next hop and prefix lengths 2 and 16, respectively. If the order of the two coming routes is reversed, the routing tables would look the same because the less specific route (38.0.0.0/8/1) would not overwrite the more specific route (38.170.0.0/16/2) at the index 38.170 in the T1_RIB. More discussion on how to update the routing table will follow shortly. The format of each entry 625 in the T1_RIB and the T2_RIB tables 620 is shown in FIGS. 2A and 2B.

For each T1_RIB entry 625, say T1_Entry[31:0], use the bit fields as follows. T1_Entry[31] is the most significant bit (a marker bit 650) and represents whether this entry 625 stores next hop/prefix length information or a K value/pointer to a T2_RIB table 620. If T1_Entry[31] is 0, T1_Entry[30:16] is not used, T1_Entry[15:6] stores next hop information 630 and T1_Entry[5:0] stores the prefix length 635 associated with this route. Otherwise, T1_Entry [30:27] stores the value 645 of (K−1) (note these 4 hits can represent the value from 0 to 15, thereby indicating the real K value from 1 to 16) and T1_Entry[26:0] stores a base pointer 640 to its T2_RIB. These 27 bits are far more than sufficient for indexing into the second level table T2_RIB since the size of the tables created will never require 128 MB ($2^{27}$ bytes) of memory space).

For each T2_RIB entry 625, the first 10 bits are used to store the next hop 630 while the remaining 6 bits are used to store the prefix length 635 associated with the entry 625.

For each entry 625 in the T1_RIB define an integer K that is in the range from 1 to 16. Consider an entry 625 indexed by i (representing a 16 bit IP address, say a.b) (in this application, the dot format a.b of the most significant 16 bits of the IP address is used interchangeably with its decimal value i=a*256+b to denote the index to the table T1_RIB) in T1_RIB. For example, for the first entry 625 in T1_RIB, its index i is 0 representing the 16 bit IP prefix 0.0. For the $32,772^{nd}$ entry 625 in T1_RIB, its index i is 32,771 representing 128.3. The maximum prefix length 635, say Pl_Max [i], is found for all the routes in the routing table whose prefix begins with 16 bits a.b. If this maximum prefix length 635 is no more than 16, then K is not defined for this entry 625 indexed by i. Otherwise, K[i]=Pl_Max[i]−16. If K[i] is defined, the value of K[i]−1 will be stored at the 4 bits T1_Entry[30:27] at the entry 625 indexed by i. For example, suppose that the whole routing table contains only 2 entries with prefix beginning with 128.3: 128.3/16/1; 128.3.255/24/3. In this case the maximum prefix length 635 is Pl_Max[128.3]=24. So, the K value associated with the entry 625 indexed by 128.3 is K[128.3]=24−16=8. It should be noted that the K value may change dynamically as new routes are added into or deleted from the routing table. Suppose a new route, say 128.3.255.252/30/2, is added to the routing table. Then the maximum prefix length 635 Pl_max[128.3] becomes 30 and its associated K value K[128.3]=30−16=14. From analyzing exemplary routing table traces of backbone routers, the number of entries in the T1_RIB whose K value ranges from 1 to 16 is shown in TABLE 1.

a K value of 8, which means the maximum prefix length 635 is 24. This is in accordance with a prior art observation that more than 50% of the routes in backbone routers have a prefix length 635 of 24.

As noted earlier, for entry i in the T1_RIB table 615, let T1_Entry[31:0]=T1_RIB[i]. If the marker bit is set to 1, T1_Entry[30:27] stores the value of K[i]−1 and T1_Entry[26:0] stores a base address 640 pointing to the beginning address of a second level table T2_RIB. There are $2^{K[i]}$ entries in T2_RIB and each entry 625 is 2 bytes. Note that the size of this second level table may change dynamically as new routes are added or deleted, causing changes in the K value. The total size of the T2_RIB table 620s is the sum of $2*2^{K[i]}$ (bytes) over i for K[i]>0.

Consequently, the total T2_RIB table 620 size varies depending on the route distribution. For all of the shown backbone routers, the total table size including the T1_RIB (with a fixed size of 256 KB) and T2_RIB is no more than 1.8 MB if the 16/K data structure is used to store these routing tables.

Note that the size of the second level table T2_RIB is much bigger than that of the T1_RIB table 615. The T2_RIB table 620 may store a lot of redundant information. For example, suppose there is only one route (128.3.0.0/16/1) with the 128.3 prefix existing in the routing table. If a new route (128.3.255.0/24/2) comes in, this requires the creation of a second level table with $2^{24-16}$=256 entries. From entry 1 to entry 255 in this second level table, each entry 625 will store the same information (next hop 630/prefix length 635=1/16) associated with the route (128.3.0.0/16/1). Only the last entry (entry 256) will store the information (next hop 630/prefix length 635=2/24) associated with the new route

TABLE 1

| Size\NAP | Mae-East NAP | Mae-West NAP | AADS NAP | PacBell NAP | Paix NAP |
|---|---|---|---|---|---|
| # of T1_RIB entries with K = 1 | 48 | 45 | 102 | 131 | 95 |
| # of T1_RIB entries with K = 2 | 81 | 76 | 152 | 173 | 87 |
| # of T1_RIB entries with K = 3 | 244 | 218 | 457 | 498 | 215 |
| # of T1_RIB entries with K = 4 | 112 | 124 | 185 | 194 | 114 |
| # of T1_RIB entries with K = 5 | 72 | 69 | 102 | 120 | 59 |
| # of T1_RIB entries with K = 6 | 110 | 85 | 133 | 149 | 80 |
| # of T1_RIB entries with K = 7 | 104 | 95 | 148 | 140 | 91 |
| # of T1_RIB entries with K = 8 | 1610 | 1554 | 2186 | 2484 | 1846 |
| # of T1_RIB entries with K = 9 | 6 | 5 | 5 | 8 | 2 |
| # of T1_RIB entries with K = 10 | 7 | 5 | 10 | 14 | 1 |
| # of T1_RIB entries with K = 11 | 3 | 1 | 7 | 8 | 2 |
| # of T1_RIB entries with K = 12 | 1 | 1 | 4 | 4 | 1 |
| # of T1_RIB entries with K = 13 | 1 | 0 | 2 | 3 | 0 |
| # of T1_RIB entries with K = 14 | 1 | 0 | 1 | 1 | 0 |
| # of T1_RIB entries with K = 15 | 0 | 0 | 0 | 0 | 0 |
| # of T1_RIB entries with K = 16 | 0 | 0 | 0 | 0 | 0 |
| Total entries with marker bit 1 | 2400 | 2278 | 3494 | 3927 | 2593 |
| % of T1_RIB with marker bit 1 | 3.66% | 3.48% | 5.33% | 5.99% | 3.96% |
| T1_RIB (Kbytes) | 256 KB | 256 KB | 256 KB | 256 KB | 256 KB |
| T2_RIB (Kbytes) | 945 KB | 850 KB | 1316 KB | 1498 KB | 987 KB |
| Total (Kbytes) | 1201 KB | 1106 KB | 1572 KB | 1754 KB | 1243 KB |

The total number of entries in the T1_RIB table 615 whose marker bit is set to 1 is also given in the table. It shows that the percentage of those entries with marker bit set to 1 is less than 6%. This implies that most of the entries in the T1_RIB table 615 store next hop and prefix length 635 instead of a base pointer to the second level table T2_RIB. From the table, also observe that more than 50% of those entries in the T1_RIB table 615 with marker bit set to 1 have (128.3.255.0/24/2). So, one can compress the second level table by using the same technique as described in the aforementioned applications. This compressed data structure is called a 16/Kc table.

For the sake of analysis and to motivate the design for the 16/Kc scheme, imagine dividing the T2_RIBs of the 16/K scheme into 64-entry blocks (the block size can be chosen to be any value). If the T2_RIB table 620 has less than 64 entries, use one block to represent it. Call the number of unique next hop/prefix length entries in a block to be its "dimension", and represent it with dim(NHPL). TABLE 2 gives the number of blocks in the T2_RIB table 620 whose dim(NHPL) is equal to 1, 2, 3 and 4 for the aforementioned sampled routers. It shows that most of the blocks have a dim(NHPL) between 1 and 4. The maximum dim(NHPL), namely $D_{max}$, is also reported in the table.

TABLE 2

| dim(NHPL)–AP | Mae-East | Mae-West | AADS | PacBell | Paix |
|---|---|---|---|---|---|
| 1 | 3426 | 2751 | 4817 | 5246 | 3052 |
| 2 | 541 | 541 | 845 | 1037 | 516 |
| 3 | 1483 | 1361 | 2134 | 2231 | 1301 |
| 4 | 348 | 313 | 596 | 639 | 373 |
| Sub total (1-4) | 5798 | 4966 | 8392 | 9153 | 5242 |
| 5 through $D_{max}$ | 2223 | 2274 | 2973 | 3770 | 3134 |
| $D_{max}$ | 42 | 41 | 40 | 33 | 44 |
| Table Size (KB) | | | | | |
| T1_RIB | 256 KB | 256 KB | 256 KB | 256 KB | 256 KB |
| T2_RIB | 125 KB | 113 KB | 177 KB | 201 KB | 130 KB |
| Extended T2_RIB | 24 KB | 27 KB | 35 KB | 42 KB | 40 KB |
| Total (KB) | 405 KB | 396 KB | 468 KB | 499 KB | 426 KB |

The table shows that $D_{max}$ can be quite large (from 33 to 44 for the five backbone routers). Note that $D_{max}$ represents the maximum dim(NHPL) among all the blocks in T2_RIB.

Figure 3:
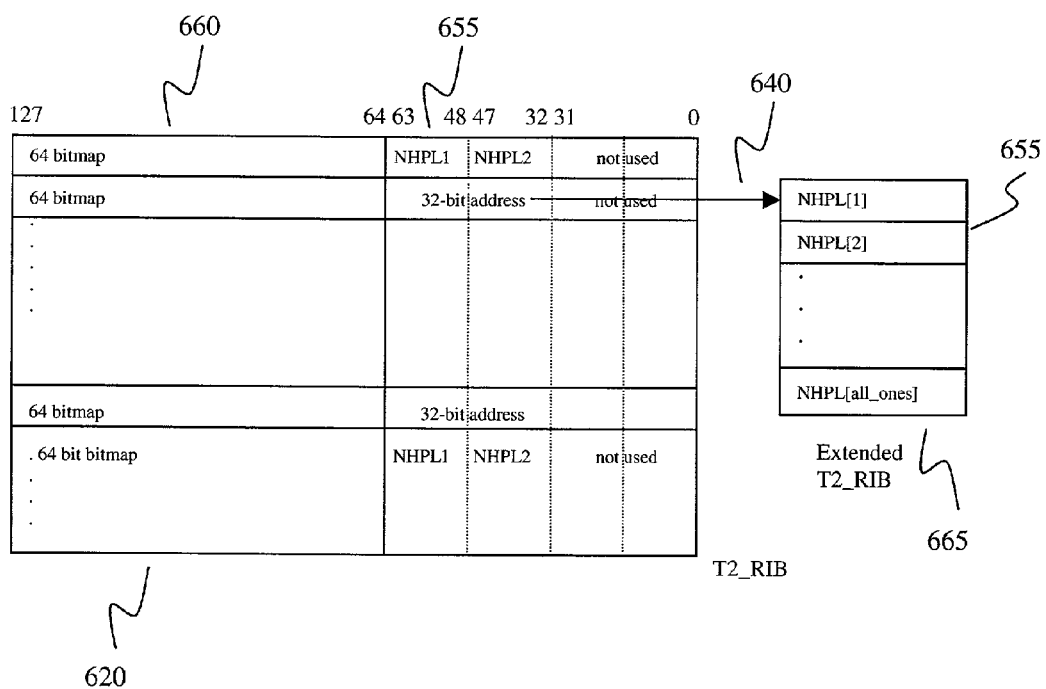
FIG. 3 shows the data structure of a 16/Kc scheme in another embodiment.

For the 16/Kc scheme shown in FIG. 3, the T2_RIB table 620 is compressed without changing the T1_RIB table 615. Each entry T2_Entry in the second level table T2_RIB in the 16/Kc scheme has 16 bytes (i.e., 128 bits).

T2_Entry[127:64] is a 64 bit bitmap 660 (FIG. 3). The most significant bit T2_Entry[127] is always set to 1. For a bit at position j, the number of leading 1's from the most significant bit T2_Entry[127] to this position, including the bit at this position j, gives the index into the NHPL array which stores next hop/index and prefix length information. The NHPL array for this entry 625 may be part of the entry 625, or it may be a separate extended table, depending on its size.

T2_Entry[63:0] stores one or two NHPLs 655 or a 32-bit address. If dim(NHPL)<2, T2_Entry[63:0] stores NHPL information 655 (in the order of NHPL[1], NHPL[2]). Otherwise, T2_Entry[63:32] stores a 32-bit address which points to where the extended NHPL array 665 is stored, i.e., T2_Entry[63:32]=&NHPL[1].

The least significant 32 bits in the T2_RIB entry T2_Entry [31:0] are not used. They can be used to store NHPL[3] and NHPL[4] for fast lookup. Then, in this case, the extended T2_RIB table 620 will be needed if dim(NHPL) is more than 4, rather than 2.

For illustration purposes, one can generate the bitmap 660 and NHPL array for the 16/Kc scheme by scanning a 16/K T2_RIB table 620. For the 16/K T2_RIB table 620, scan through one block of 64 entries at a time. For each block create a 64-bit bitmap 660 with one bit representing each entry 625 in the block. For the first entry 625 in the block, always set the most significant bit in the bitmap 660 to 1 and store its associated NHPL content 655 into the first part of an NHPL array, say NHPL[1]. Then, check whether the second entry 625 shares the same NHPL information 655 as the first entry 625. If it does, set the second bit in the bitmap 660 to 0. Otherwise, set the second bit to 1 and add its NHPL content 655 to NHPL[2]. This process continues until all the 64 entries in the block are finished. For example, suppose there are only two routes in the routing table, namely, 128.3.0.0/16/1 and 128.3.255/24/2. So, there are $2^{24-16}=256$ entries in the T2_RIB table 620. All entries in this T2_RIB table 620 except for the last store 1/16. The last entry 625 stores 2/24. In the 16/Kc scheme, divide this T2_RIB table 620 into 256/64=4 blocks. For the first 3 blocks, since all the entries in the blocks store the same NHPL information 655, a bitmap 0x8000000000000000 and associated NHPL array with NHPL[1]=1/16 are used. For the last block, use a bitmap 0x8000000000000001 is used (since only the last entry 625 will be different from all the other 63 entries) and an associated NHPL array with NHPL[1]=1/16, NHPL[2] =2/24. These bitmaps 660 and NHPL arrays will be stored in the 16/Kc T2_RIB table 620 in the order corresponding to the blocks in the original 16/K T2_RIB table 620. That is, the first entry 625 in the 16/Kc T2_RIB table 620 corresponds to the first block in the 16/K T2_RIB table 620, the second entry 625 in the 16/Kc T2_RIB table 620 corresponds to the second block in the 16/K T2_RIB table 620, and so forth.

Note that the total number of 1's in the 64-bit bitmap 660 denotes dim(NHPL). If the total number of one's in the 64-bit bitmap 660 is between 1 and 2, store the NHPL array at the field [63:32]. Otherwise, the NHPL array will be stored in an extended T2_RIB table 620.

In the 16/K scheme, for each entry 625 in the T1_RIB table 615 whose marker bit is set to 1, there is an associated T2_RIB table 620 with $2^K$ entries (each entry 625 is 2 bytes), where K is stored in the T1_RIB entry 625. For the compressed 16/Kc scheme, this associated T2_RIB table 620 is compressed to have $2^{max(0, K-6)}$ entries (each entry 625 is 16 bytes). If the K value is less than 6, then there is only one entry 625 in T2_RIB. Otherwise, there are $2^{K-6}$ entries in the T2_RIB table 620.

Note that each entry 625 in the extended T2_RIB is 2 bytes storing next hop and prefix length information. By analyzing the routing traces from the aforementioned backbone routers, one observes that the size of the extended T2_RIB tables 620 is no more than 40 Kbytes. Note that the size of a T2_RIB table 620 is compressed by a factor of 8 in the 16/Kc scheme compared to the 16/K scheme.

For the 16/Kc scheme, the total table size is less than 0.5 MB to store the backbone routing tables. If needed, one can furthermore compress the table to less than 256 KB by using fewer bits for each entry 625 in T1_RIB, using all the 128 bits in T2_RIB entry 625 for bitmaps 660, and storing all NHPL information 655 in the extended T2_RIB table 620.

The next section presents a route update algorithm to create the bitmap 660 and NHPL array for the 16/Kc scheme without creating the T2_RIB of the 16/K scheme first.

Figure 4:
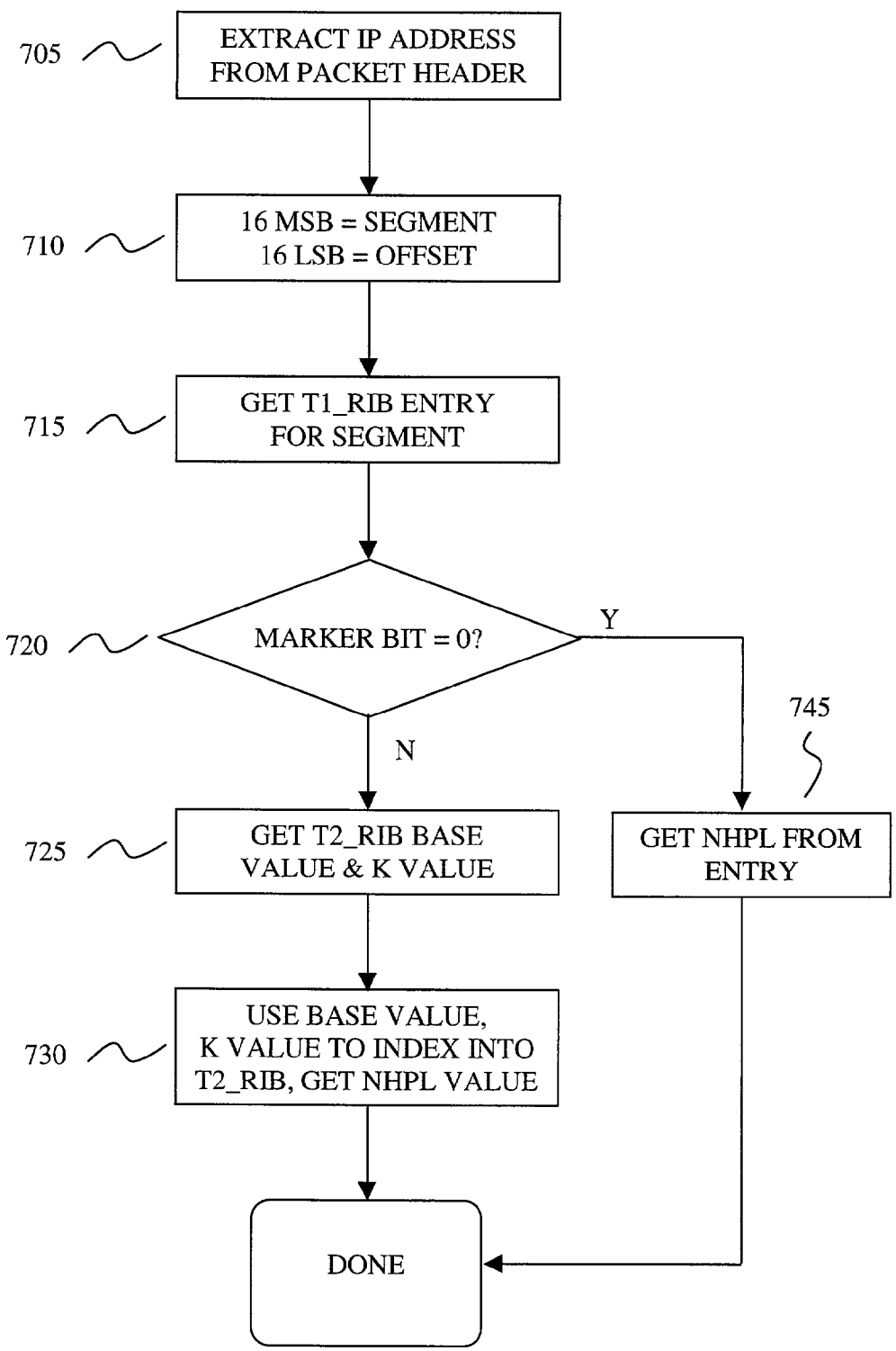
FIG. 4 is a routing table lookup flowchart according to an embodiment of the present invention.
Figure 5:
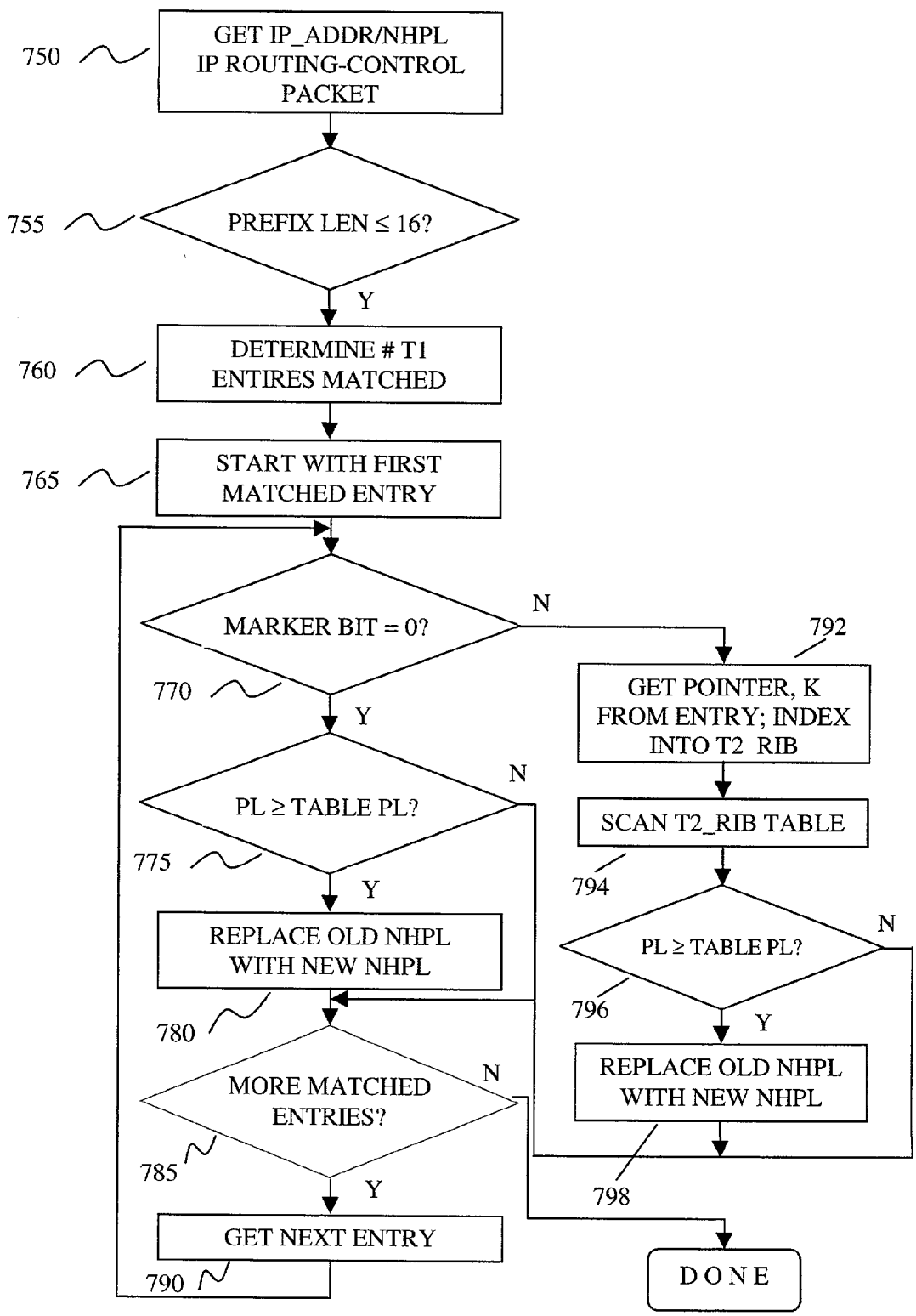
FIG. 5 shows a 16/K route update flowchart according to an embodiment of the present invention.

FIGS. 4 and 5 illustrate example route lookup and update algorithms, respectively, for both the 16/K and 16/Kc data structures. Upon receiving an IPv4 data packet at the ingress line card, the router will take the following steps for each routing table lookup:

1. Extract the 32-bit destination IP address field Ip_Addr [31:0], from the packet header (FIG. 4, S705). The most significant 16 bits are interpreted as the segment 605 and will be used as an index into the T1_RIB table 615 (S710).
2. Using the segment value from the previous step, load from the T1_RIB the proper 4-byte entry 625 corresponding to T1_RIB[segment] (S715).
3. Examine the marker bit (S720). If the marker bit is 0, the next hop and prefix length information is stored in this T1_RIB entry 625 and can be returned (S745). Otherwise, this T1_RIB entry 625 corresponds to a T2_RIB base pointer and a K value (S750). If this is the case, another memory access is required as described below.
4. The K value indicates how many entries are in this T2_RIB table 620 and consequently how many more bits of the IP address are needed to complete this lookup. The number of entries in the T2_RIB is $2^K$. Thus K more bits must be extracted from the IP address in order to form the index into the T2_RIB (S725). The T2 index is thus T2_Index=Ip_Addr[15:16−K].
5. Now that the base pointer and the index for the T2_RIB have been obtained, the T2_RIB entry 625 can be loaded from memory at T2_RIB[T2_Index] (S730) and the specific next hop 630 for this route can be returned.

The pseudo code of the complete 16/K route lookup algorithm is given in APPENDIX A. Note that each route lookup will need two memory accesses in the worst case. Typically, a lookup will require only one access to the T1_RIB table 615. An illustrative example will be given later as the route update algorithm is presented in the next sub-section.

Moving on to the 16/K route update algorithm, as shown in FIG. 5, upon receiving an IP routing control packet containing the 3-tuple (Ip_Addr, Prefix_Length, Next_Hop) (FIG. 5, S750), the routing table needs to be updated. In this application, only how to add a new route is discussed. Deleting a route would take the inverse action and is omitted in this paper for simplicity. To add a new route, one needs to consider two cases: 1) the prefix length 635 associated with the new route is either less than or equal to 16; 2) it is greater than 16.

For the case where the prefix length 635 is less than or equal to 16 (S755), i.e., Prefix_Length<=16, determine how many entries in the T1_RIB table 615 are matched by the new route (S760). Consider a new route update (128/8/1). This new route matches $2^{16-8}$=256 entries in T1_RIB from 128.0 to 128.255. For each matched entry 625 in the T1_RIB, the marker bit needs to be examined (S760). If the marker bit is 0 (S770), then check whether the Prefix_Length is equal to or larger than the old prefix length 635 which is stored in the table (S775). If Prefix_Length>=Old_Prefix_Length (S775), then change the old next hop and prefix length 635 information stored in the entry 625 with the new next hop and prefix length information (S780) since the new route is newer and at least as specific. If the marker bit is 1 (S770), retrieve the pointer stored in the T1_RIB table 615 entry 625 (S792) and scan through the $2^K$ entries in the T2_RIB table 620 (S794) to see whether the new route update is more specific than the old route stored in the T2_RIB table 620. Again, if Prefix_Length>=Old_Prefix_Length (S796), update the entry 625 in T2_RIB with the new next hop and prefix length information (S798).

Figure 6B:
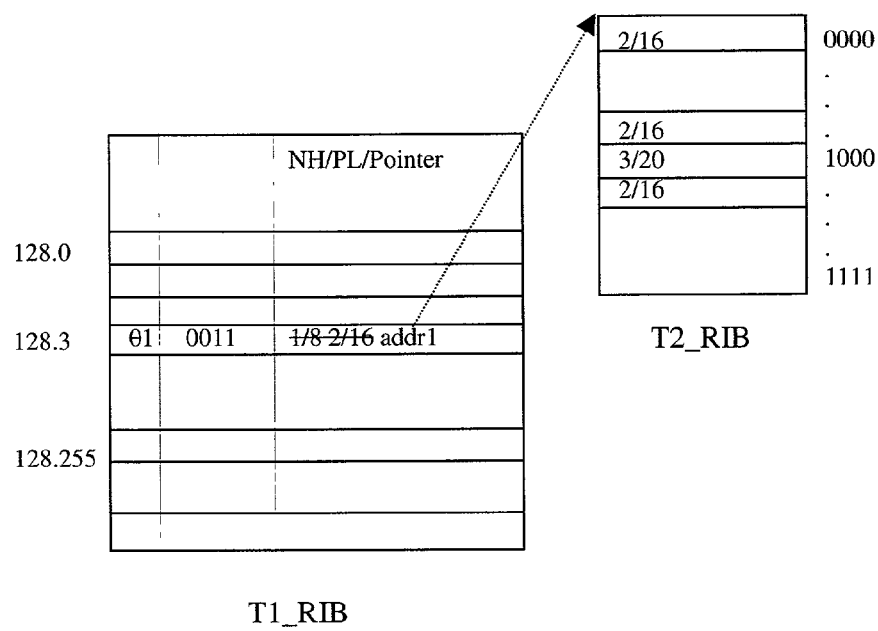

As an illustrative example, suppose the routing table is initially empty and a new route update of (128/8/1) arrives as shown in FIG. 6A. This requires that entries in the T1_RIB corresponding to 128.0 to 128.255 need to be updated with a next hop 630 of 1 and prefix length 635 of 8. If a second route update (128.3/16/2) arrives as shown in FIG. 6B, the matched entry 625 in the T1_RIB table 615 indexed by 128.3 needs to be updated with 2/16 as next hop and prefix length information since the second route is more specific than the first route.

For the second case, i.e., Prefix_Length>16, use the most significant 16 bits of the IP address to match one entry 625 in the T1_RIB. First, compute the New_K value given by prefix_Length−16. If the marker bit is 0, the new route is more specific than the current route and one needs to build a new T2_RIB for this entry 625, turn on the T1_RIB entry's marker bit, set its K field, and update the T1_RIB entry 625 to point to the new T2_RIB table 620. Lastly, the new T2_RIB table 620 needs to be populated with data, one route of which will be this new route. To populate the new T2_RIB table 620, the remaining New_K bits of the prefix are used as an index and the next hop/prefix length information is loaded into this entry 625 in the T2_RIB table 620. All other entries are set to the next hop/prefix length values that were previously in the T1_RIB entry 625.

If the marker bit is 1, depending on the current size of the T2_RIB, it is possible numerous T2_RIB entries may be matched or the T2_RIB may have to be grown. If the New_K value is less than or equal to the Old_K value, there is no need to expand the T2_RIB table 620. In this case, there is only a need to update the matched entries in T2_RIB with the new next hop and prefix length information if Prefix_Length>=Old_Prefix_Length. The remaining unmatched entries in T2_RIB will be untouched. If the New_K value is greater than the Old_K value, change the K value in the T1_RIB to the New_K value, create a new T2_RIB table 620 with $2^{New\_K}$ entries, set the T1_RIB entry 625 to point to this new table, and populate this new table. The matched entry 625 in the T2_RIB table 620 will be updated with the new next hop and prefix length information while the remaining unmatched entries will be filled up with the corresponding information stored in the old T2_RIB.

As a continuation of the example, suppose a third route update (128.3.128/20/3) arrives as shown in FIG. 6C. Since the marker bit in T1_RIB[128.3] is 0, a T2_RIB table 620 is to be added. A new K value of K=20−16=4 is computed and the marker bit is set to 1. Next, a T2_RIB with $2^K$=16 entries is created and is pointed to by the T1_RIB entry 625. To populate the new T2_RIB table 620, the 4 bits following the most significant 16 bits of 128.3.128 are used as an index into the T2_RIB. This T2_RIB entry 625 is updated with the new next hop and prefix length information, i.e., 3/20. The remaining 15 unmatched entries will be filled up with the old next hop/prefix length information (2/16) which was stored in T1_RIB[128.3].

Figure 6D:
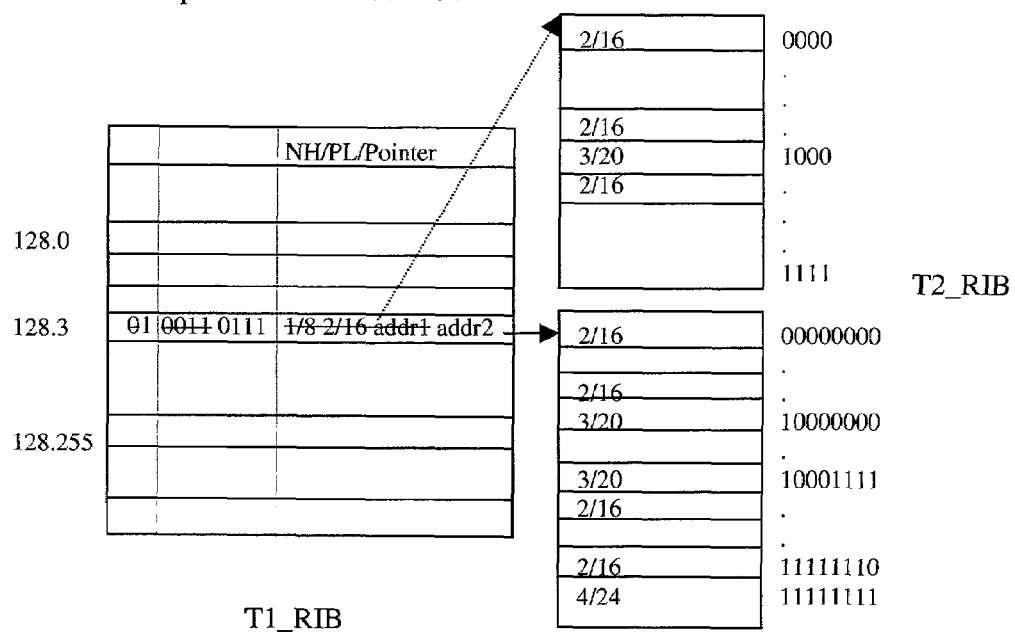

If a fourth route update (128.3.255/24/4) arrives as shown in FIG. 6D, a similar procedure is followed but this time the K value of the arriving route (24−16=8) is larger than the current K value for the T2_RIB. Thus a new larger T2_RIB needs to be created, linked into the table, and populated. The matched entry 625 in T2_RIB indexed by 8'b11111111 will be filled with the new next hop/prefix length information (4/24) while those unmatched entries in the new T2_RIB will be filled with the next hop 630 and prefix length 635 which is stored in the old T2_RIB (undergoing a 1 to 16 expansion).

To illustrate how the 16/K route lookup algorithm works, assume that the T1_RIB and T2_RIB tables 620 have been filled up as in FIGS. 6A-6D. Suppose a packet with destination address 128.0.2.3 arrives. Since the marker bit in the T1_RIB[128.0] entry 625 is 0, it returns the next hop "1" (associated with the first route (128/8/1) stored in the entry 625. Indeed only the first route gives the longest prefix match while all the other routes do not match.

Another packet with a 128.3.254.2 destination address matches a T1_RIB[128.3] entry 625 whose marker bit is set to 1 and K value is 8. The following 8 bits ($254_d=11111110_b$) are used as an offset into the T2_RIB table 620 which gives next hop "2" (associated with the second route 128.3/16/2). Indeed the second route gives the longest prefix match.

Another packet with 128.3.128.4 destination address matches T1_RIB[128.3] with marker bit set. The following 8 bits ($128_d=10000000_b$) are used to index T2_RIB and find the next hop "3", which is associated with the third route 128.3.128/20/3. The third route does give the longest prefix match.

Pseudocode for the 16/K route update algorithm is shown in APPENDIX B.

Figure 7:
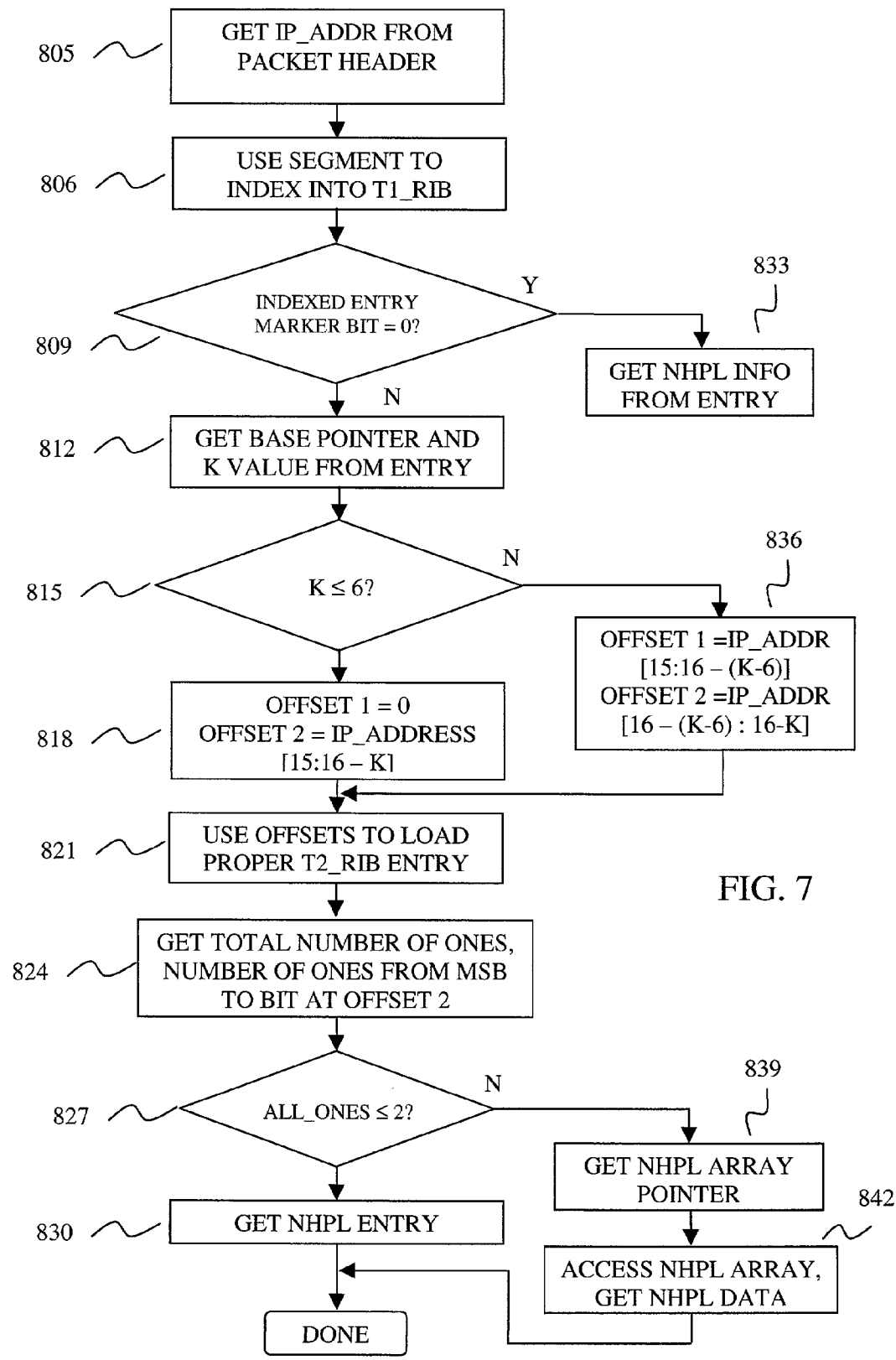
FIG. 7 shows a 16/Kc routing lookup flowchart according to an embodiment of the present invention.

An example lookup algorithm for the 16/Kc data structure is described below in conjunction with the flowchart in FIG. 7.

1. Extract the 32-bit destination IP address field Ip_Addr [31:0] from the packet header. The most significant 16 bits are interpreted as the segment 605 and will be used as an index into the T1_RIB table 615 (S803).
2. Using the segment value from the previous step, load from the T1_RIB table 615 the proper 4-byte entry 625 corresponding to T1_RIB[segment] (S806).
3. Examine the marker bit (S809). If the marker bit is 0, the next hop information 630 is stored in this T1_RIB entry 625 and can be returned (S833). Otherwise, this T1_RIB entry 625 corresponds to a T2_RIB base pointer and a K value (S812). If this is the case, another memory access is required.
4. If another memory access is required, compute two values necessary to index into the T2_RIB: offset1 and offset2. Note that offset1 is used to index the particular entry 625 in the T2_RIB and offset2 to index the bit position in this entry 625. If K<=6 (S815), which means that there is only one entry 625 in the T2_RIB, set offset1=0 and compute offset2 to be equal to the next most significant K bits of the IP address Ip_Addr [15:16-K] (S818). Otherwise, i.e., K>6, compute offset1 and offset2 as follows. offset1 is set to the next K-6 significant bits of the IP Address Ip_Addr[15:16-(K-6)]. Offset2 is set to the remaining 6 bits Ip_Addr [16-(K-6)-1:16-K] (S836).
5. Once offset1 and offset2 have been computed, the second memory access can take place in order to load the 64-bit bitmap 660 and next hop array pointer/data (S821).
6. From this bitmap 660, the number of 1's needs to be computed (All_Ones) as well as the number of leading 1's (Leading_Ones) from the most significant bit to the bit position at offset2 (S824).
7. If All_Ones<=2 (S827), the next hop information 630 in this T2_RIB entry 625 is next hop data 630 and not a pointer to a next hop array (S830). Otherwise, the next hop information 630 in this T2_RIB entry 625 is a pointer (S839) and a third memory access is necessary (S842). The Leading_Ones value is used to determine where the desired next hop information 630 is in either the next hop data 630 in the T2_RIB entry 625 or the next hop array.

The pseudo code of the 16/Kc lookup algorithm is given in APPENDIX C. For the 16/Kc data structure, each lookup will need at most three memory accesses in the worst case.

Figure 8A:
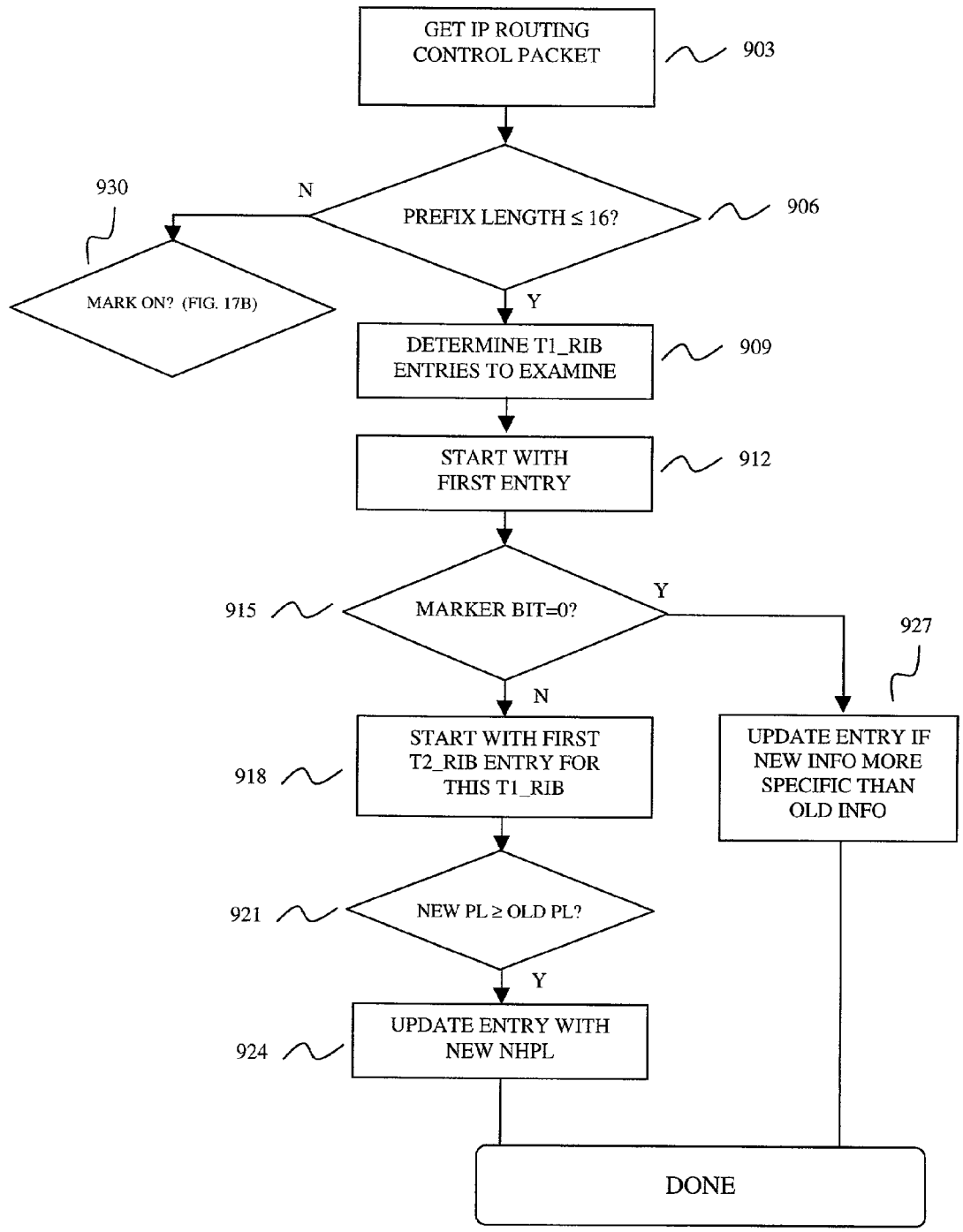
FIGS. 8A and 8B are a flowchart of 16/Kc updating according to the embodiment.
Figure 8B:
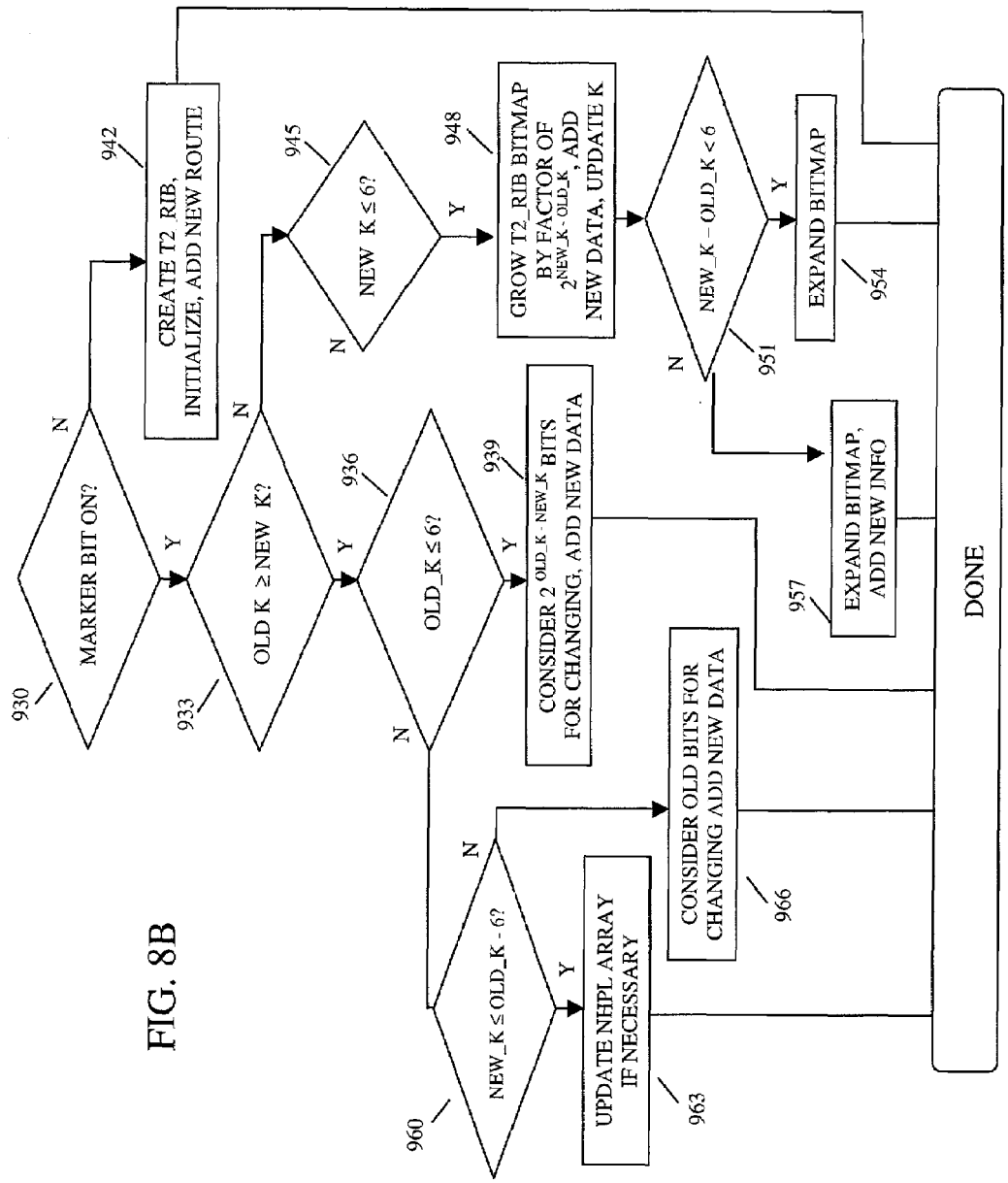

The following is a description of an example 16/Kc update algorithm with reference to FIGS. 8A and 8B. As shown in FIG. 8A, when a new route needs to be added to the database (FIG. 8A, S903), it will fall under one of two categories, Prefix_Length<=16 or Prefix_Length>16.

If Prefix_Length<=16 (S906), one or more T1_RIB entries need to be examined as candidates for being updated. $2^{16-Prefix\_Length}$ entries need to be examined, with the starting index being the "Prefix_Length" most significant bits of the Ip_Addr multiplied by $2^{16-Prefix\_Length}$ (S909). For each T1_RIB entry 625, if the marker bit is off (S915), the next hop/prefix length information in this entry 625 can be updated if this route is a more specific route than what is currently in the table (S927). Otherwise, if the marker bit is on (S915), a T2_RIB exists already and all entries in the T2_RIB table 620 are candidates for having their next hop/prefix length data updated. For each T2_RIB entry 625 (S918), if Prefix_Length>=Old_Prefix_Length (S921), which is the original prefix length 635 stored in the T2_RIB entry 625, update the entry 625 with the new NHPL 655 (S924).

If Prefix_Length>16 (S906), this corresponds to a single T1_RIB entry 625 indexed by the 16-bit Ip_Addr[31:16]. If the T1_RIB entry 625 at this index has its marker bit off (FIG. 8B, S930), then this is an attempt to add a route more specific than the one specified in the T1_RIB entry 625. A new T2_RIB of size $2^{New\_K-6}$ needs to be created, populated with data, and linked into the T1_RIB entry 625 (S942). Specifically, the T2_RIB table 620 is created, all bitmaps 660 are initialized to a single leading 1, and the NHPL array is initialized to contain the NHPL data of the original T1_RIB entry 625. Lastly, the new route is added according to the previously specified rules which results in changing the bitmap 660 and NHPL array. Otherwise if the marker bit is on (S930), a different procedure, as illustrated in FIG. 8B, must be followed to add the entry 625 to the T2_RIB table 620.

For the rest of this section Old_K and New_K will be used to refer to the K value found in the T1_RIB entry 625 and the new K value New_K=Prefix_Length-16.

As shown in FIG. 8B, if the entry 625 being added has an Old_K>=New_K (S933) then two different cases can be identified—Old_K<6 and Old_K≦6.

If Old_K<=6 (S936) and New_K<=Old_K (S933) then the current T2_RIB has only one entry 625. This entry 625 contains a bitmap 660 with only $2^{Old\_K}$ of bits. To add the new route, a subset of $2^{Old\_K-New\_K}$ bits from the bitmap 660 may need to be changed and the new data needs to be added to the NHPL array according to the previously specified rules (S939).

Otherwise, if Old_K>6 (S936) then multiple T2_RIB entries currently exist. Multiple entries may have been matched and may need to be updated. If New_K<=Old_K-6, (S960), then multiple entries may be matched. In this case, there is no need to change the bitmap 660. The NHPL array only need be updated if necessary (S963). If, on the other hand, New_K>Old_K-6, (S960), then only one T2_RIB entry 625 has been matched. Furthermore, only a portion of the entry's bitmap 660 has been matched and needs to be examined. Once again, the bitmap 660 and NHPL data 655 are updated with the new route's next hop information 630 according to the previously specified rules (S966).

If the New_K is greater than the Old_K (S933), the new route is more specific than the stored route and more bits should be used (New_K bits from the IP addresses) to index into the T2_RIB table 620. The T2_RIB that exists already needs to be grown in size. If New_K<=6 (S945), then since Old_K<New_K<=6 (S933), there exists only one entry 625 in the T2_RIB table 620 and its bitmap 660 needs to be grown by a factor of $2^{New\_K-Old\_K}$ (S948). Zeros in the bitmap 660 should duplicate themselves into zeroes, while 1's in the bitmap 660 should turn into one leading 1 followed by $2^{New\_K-Old\_K}-1$ zeros. After the bitmap 660 is grown, the new route and NHPL data 655 should be overlaid into the bitmap 660 and NHPL array according to the previously specified rules. Lastly, the K value stored in the T1_RIB entry 625 for this route needs to be updated to reflect this larger New_K value. If New_K>6 (S954), then a new T2_RIB table 620 must be created with $2^{New\_K-6}$ entries. If New_K-Old_K<6 (S951) then each bit in the old T2_RIB is expanding into a fragment of a 64-bit bitmap 660. Again, 0's are expanded into $2^{New\_K-old\_K}$ 0's and 1's are expanded into a single leading one and $2^{New\_K-Old\_K}-1$ 0's. The NHPL data 655 stays the same but needs to be placed into the appropriate arrays. If New_K-Old_K>=6, each bit is expanding into at least one entire bitmap 660. In this case, 0's transform into 0's and 1's transform into a leading 1 with 63 trailing zeros. Again the NHPL data 655 needs to be placed into the NHPL array of the proper T2_RIB entry 625. Lastly, the new route is overlaid into the proper entry 625 following the previously specified rules.

Figure 9A:
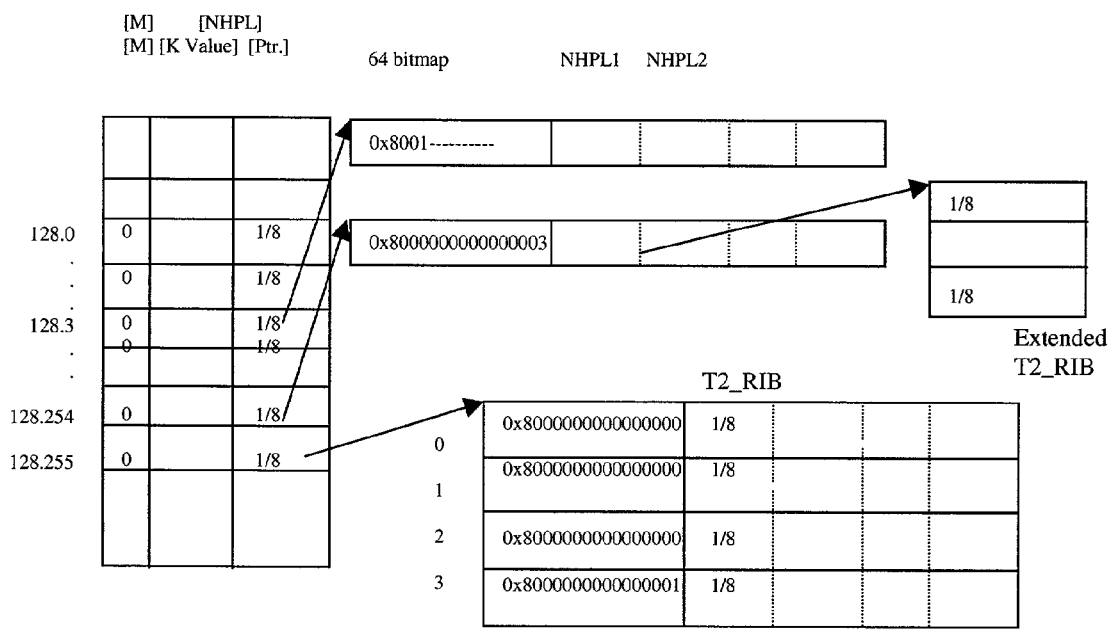
FIGS. 9A-9E show an illustrative example of updating in a 16/Kc scheme.
Figure 9B:
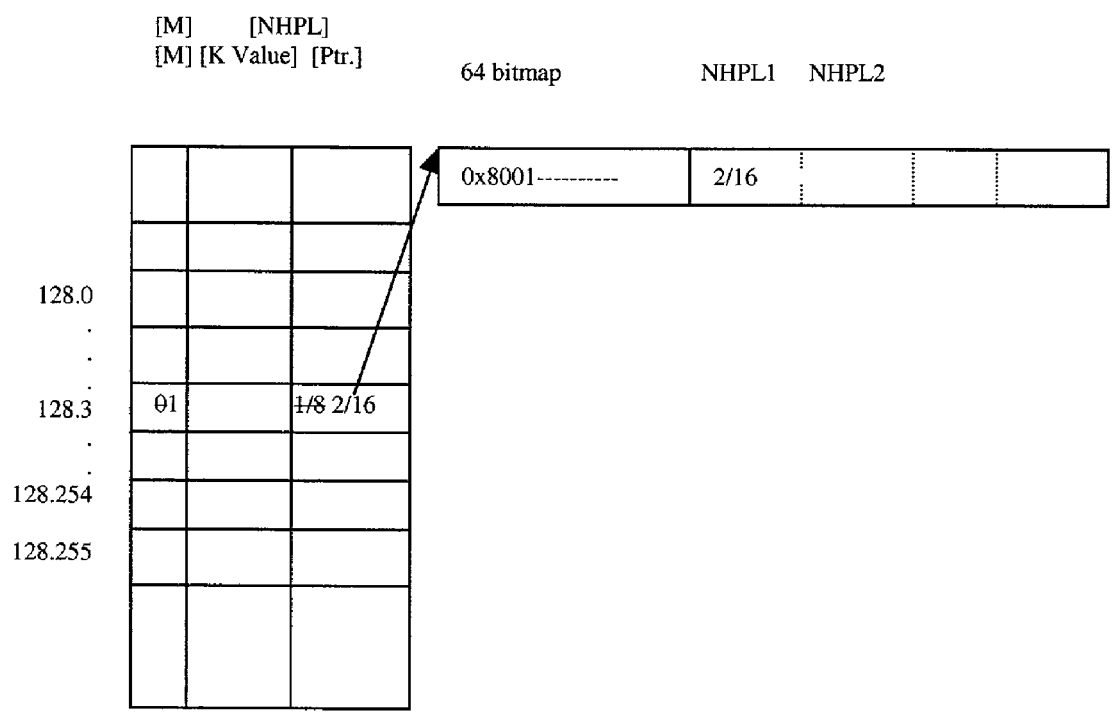

The following is an example illustrating the data structure created due to the update procedure. There are many cases that can occur but only a few of the most important ones are illustrated. The T1_RIB is completely initialized to all zeros, specifying no routes. First, in FIG. 9A consider that a new route (Prefix/Prefix_Length/Next_Hop) of ((128/8/1) arrives at the router. The prefix length 635 is less than 16, so there will be multiple T1_RIB matches. Specifically, there will be $2^{16-Prefix\_Length}=2^8=256$ T1_RIB entries that need to be examined These will range from 128.0 to 128.255. Initially, all of these entries have their mark bits turned off so the Next_Hop/Prefix_Length information in these entries needs to be updated to the new route (1/8). Next, say a second route (128.3/16/2) arrives as in FIG. 9B. The prefix length 635 is exactly 16; thus, this corresponds to a single entry, 128.3, that needs to be examined. Since this entry 625 has its mark bit off and this new route is more specific, the T1_RIB entry 625 needs to be updated.

Figure 9C:
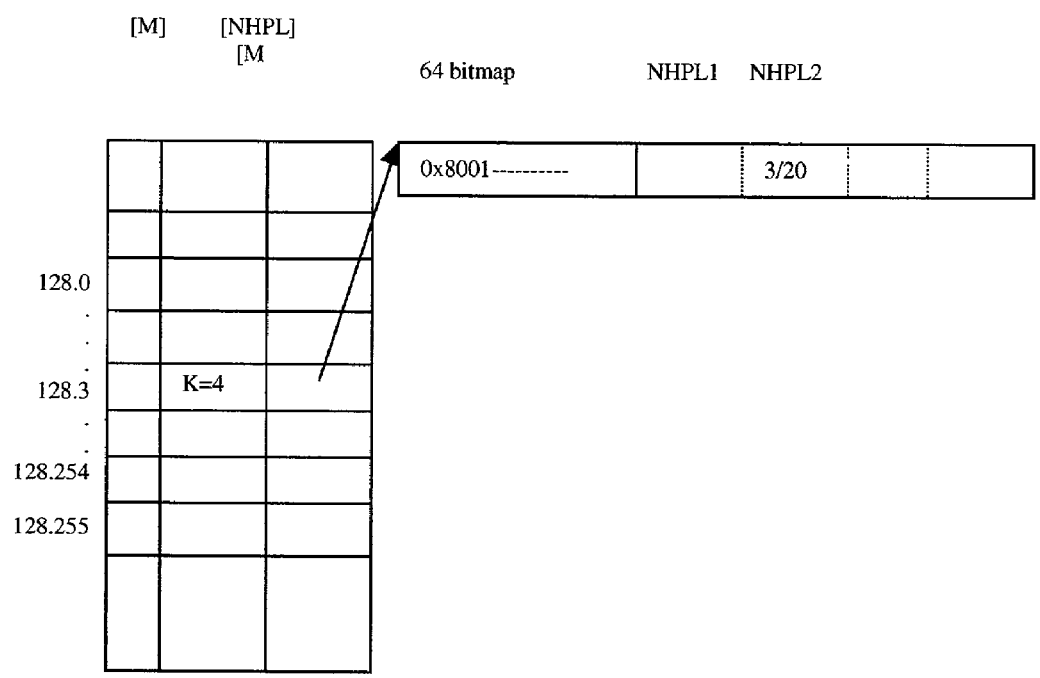

Now assume a new route (128.3.240/20/3) arrives as in FIG. 9C. The first 16 bits, 128.3, are used as an index into T1_RIB. The prefix length 635 is greater than 16 but the 128.3 T1_RIB entry 625 has its marker bit turned off. This means that a T2_RIB needs to be created and linked in. The New_K that will be stored in the T1_RIB is going to be Prefix_Length−16=4. Thus, the T2_RIB that needs to be created should only be 1 entry long, and contain a bitmap 660 of size $2^4$ bits. The bitmap 660 for this T2_RIB entry 625 will have a leading 1 specifying that the first bit and all the following bits are associated with the same NHPL data 655 that can be accessed from the first position in the NHPL array. The bitmap 660 will also have a trailing 1 for the new route (128.3.240/20/3). Since the prefix length 635 is 20, and a 16 bits have already been used to index into the T_RIB, 4 bits remain. These four bits are specifically 4'b1111 ($240_d=11110000_b$, which indicates that the final bit position in the bit map should be turned on and the NHPL array adjusted accordingly.

Figure 9D:
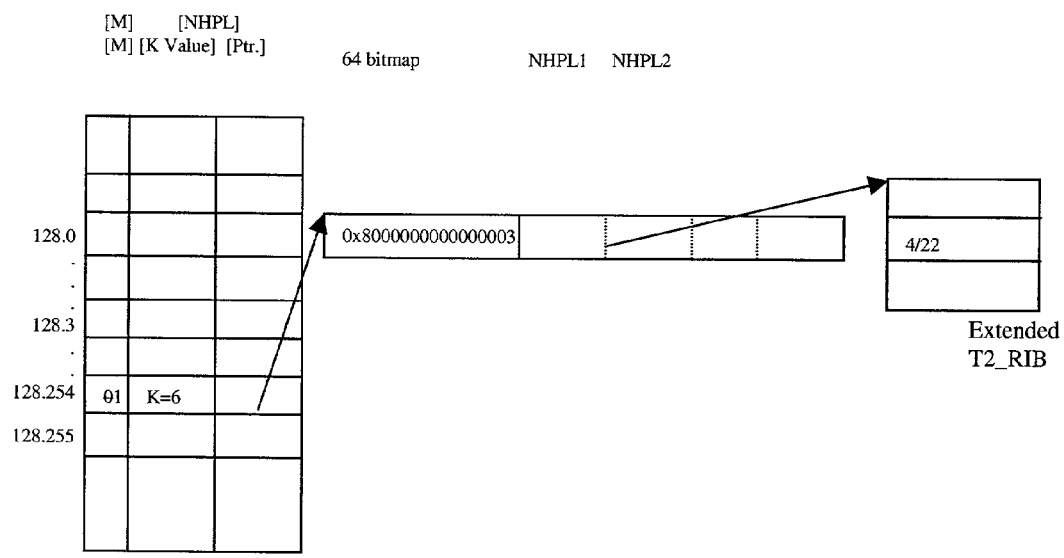

Next, assume that the route (128.254.248/22/4) arrives as in FIG. 9D. This maps to T1_RIB entry 128.254 which again has its marker bit off. Again, a T2_RIB needs to be created, this time with a bitmap 660 of size of $2^{22-16}=64$ bits. Again, the T2_RIB is initially populated with a bitmap 660 of only a single leading one and a NHPL array of a single corresponding entry (1/8). The new route (4/22) is added by turning on the second to last bit position, i.e. $62^{nd}$ bit position ($248_d=11111000_b$), and adding the NHPL data 655 to the second entry 625 in the NHPL array. However, in accordance with the previously described procedure, the last bit needs to be turned on and another NHPL entry 625 added, to signify that the NHPL data 655 associated with the final bit is different than the NHPL data 655 associated with the previous bit. Because in the current implementation only, only 2 NHPL entries are allowed in the T2_RIB, an extended T2_RIB array is created to hold these three entries and a pointer to this array is instead stored in the T2_RIB. Lastly, the new_K=4 value needs to be stored in the T1_RIB entry 625.

Figure 9E:
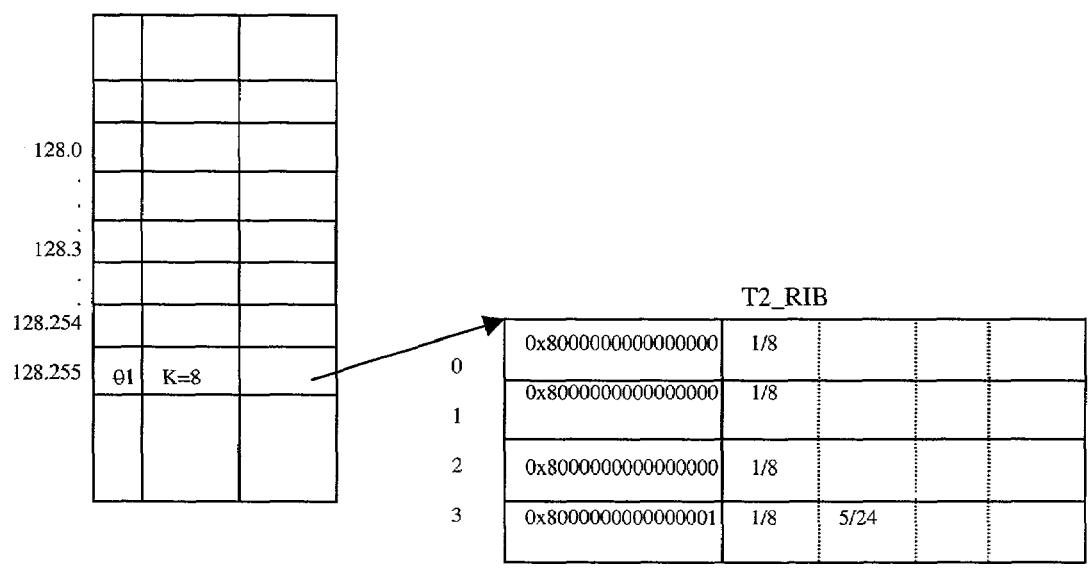

Finally, assume that the route (128.255.255/24/5) arrives as in FIG. 9E. The K value associated with this entry 625 is New_K=24−16=8. Lookup into the T1_RIB with 128.255 and discover that the marker bit is off. Thus, there is a need to create a new T2_RIB, with $2^{New\_K-6}=4$ entries. All entries in the T2_RIB are initialized to contain the old data originally stored in the T1_RIB entry 625. Lastly the route (5/24) is overlaid into the table at entry 3 bit 63 since $255_d=11111111_b$.

Pseudocode for the 16/Kc route lookup algorithm is shown in APPENDIX D.

To evaluate the performance of the 16/K and 16/Kc data structures and algorithms, they have been implemented in the C language. The evaluation software can run on any processor platform that supports C. In the simulation described below, the aforementioned processor called Xtensa, which is a high-performance and configurable 32-bit RISC-like microprocessor core, is used. Xtensa allows the designer to configure the processor with respect to bus width, cache size, cache line size, the number of interrupts, amount of on chip memory, etc. It also supports the Tensilica Instruction Extension (TIE) language (its syntax is similar to Verilog) which can be used to describe new instructions that complement the core. Using TIE to add customized instructions is quite useful for optimizing performance in many applications.

To accelerate the 16/K lookup process, the following 4 customized instructions for the Xtensa processor have been developed:

t1_index: given an IP address, extract the 16 bit index into T1_RIB;

t1_lookup: load the T1_RIB entry 625 that corresponds to the T1_Index;

t2_addr: compute the address for loading the T2_RIB entry 625 (if necessary); and t2_lookup: load the proper T2_RIB entry 625 (if needed, returns the appropriate next hop 630 from the data structure).

In order to facilitate fast lookups, the T1_RIB table 615, which is 256 KB in size, is placed into a special 256 KB 1-cycle latency on-chip memory. The remaining portions of the table are placed into off-chip SRAM memory for fast access.

The assembly coded procedure containing these special lookup instructions is shown in TABLE 3.

TABLE 3

| # of cycles | Instruction |
| --- | --- |
| 750000: | entry a1, 32 |
| 250007: | t1_index a4, a2 |
| 250000: | t1_lookup a3, a3, a4 |
| 500000: | t2_addr a2, a2, a3 |
| 335414: | t2_lookup a2, a3, a2 |
| 250000: | retw.n |
| total cycles in block: 2,335,421 | |

The instruction t2_lookup is essentially a conditional load that will either load from off-chip RAM or return the result previously loaded in t1_lookup. The disadvantage of this implementation is that the instruction t2_addr and t2_lookup will always be executed regardless of whether the next hop 630 is stored in T1_RIB or not. However, due to micro-architectural issues, branching around these instructions would not yield any better performance. Furthermore this code is optimized for worst case performance.

The Xtensa Instruction Set Simulator (ISS) was used to perform cycle-accurate simulation using a route table trace of Class A, B, Swamp and C addresses from the MAE-EAST database collected on Oct. 3, 2000. These addresses constituted a routing table database of 19,000 entries. A data packet trace with 250,000 entries (made available from NLANR Network Analysis Infrastructure), is used for route lookups. In the simulation, the processor is configured with the following key parameters: 128 bit processor interface (PIF) to memory, 32 registers, 2-way set associate caches with 16 bytes line size, a cache size of 16 Kbytes, and a clock frequency of 200 MHz. The T1_RIB is a static 256 KB and was thus placed into a fast on chip memory that can be accessed in 1 cycle. Through simulation, instruction-level profile data for a trace of 250,000 lookups shown in TABLE 3 above was obtained.

Totally there are 2,335,421 cycles for 250,000 route lookups. Equivalently, this is about 9.34 cycles/lookup. Note that even though it is shown that the instruction t1_lookup needs 1 cycle/lookup, it actually has a 2 cycle latency since it is a load instruction from on-chip memory. The extra cycle is counted in the next instruction t2_addr which depends on the results from t1_lookup. Since the size of the T2_RIB table 620 is significant, it is stored in external memory. Instruction t2_lookup will have 2 cycles latency per lookup if the data loaded by t2_lookup is in the cache. Otherwise, there is a cache miss that causes the processor to stall. This will require 7 cycles plus physical memory access time. These cache miss cycles are reflected in the cycle count for the t2_lookup instruction. Notice that there are 750,000 cycles for entry to the function rt_lookup. If macro or inline code is used, these cycles can be avoided. Therefore, it suffices to say that actually about 6.34 cycles/lookup are needed. Without using customized instructions, it would need about 40 cycles/lookup. Thus, about a 7× performance improvement can be achieved by adding specialized instructions. Furthermore, if one does two lookups for two different packets in the instruction sequence, 2 cycles of memory latency can be hidden, thus yielding 4.34 cycles/lookup. At last, the two instructions t1_index and t2_addr, into t1_lookup and t2_lookup, respectively, can be embedded. This will save another 2 cycles. Thus 2.34 cycles/lookup that is equivalent to 85 MLPS in the typical case for an Xtensa processor running at 200 MHz can be achieved.

Consider the worst case where the t2_lookup load instruction is always a cache miss. Suppose the second level table T2_RIB is stored in external SRAM memory which typically has an access time of 10 ns (this is 2 cycles for a processor at 200 MHz). Based upon micro architecture issues, the t2_lookup instruction will need 7 cycles plus 2 cycles of physical memory access time. Totally, 13 cycles/lookup are needed, including 1 for t1_index, 2 for t1_lookup, 1 for t2_addr, and 9 for t2_lookup. Again, if two lookups are coded into each instruction sequence, 2 cycles of memory latency can be hidden.

For the 16/Kc scheme, the following 6 customized instructions were designed:

1. t1_index: Same as 16/K;
2. t1_lookup: Same as 16/K;
3. t2_addr: compute the address for loading the T2_RIB entry 625;
4. t2_lookup: load the 128 bits from the address given by the t2_addr instruction. If the marker bit in the T1_RIB entry 625 loaded in t1_lookup is 0, this load will effectively not take place;
5. t3_addr: compute the address for loading the extended T2_RIB entry 625; and
6. t3_lookup: load the result from the address given by the t3_addr instruction. If this load is not necessary, if will effectively not go to memory.

TABLE 4 below gives the simulation results of 16/Kc scheme.

TABLE 4

| # of cycles | Instruction |
| --- | --- |
| 750000: | entry a1, 32 |
| 250000: | t1_index a4, a2 |
| 250000: | t1_lookup a3, a3, a4 |
| 500000: | t2_addr a4, a2, a3 |
| 495882: | t2_lookup a4 |
| 500000: | t3_addr a4, a3, a2 |
| 451496: | t3_lookup a2, a4 |
| 250000: | retw |
| total cycles: 3,447,378 | |

It shows 3,447,378/250,000≅13.79 cycles/lookup are needed. Excluding the 3 cycle overhead of function entry and exit, 10.79 cycles/lookup are needed. Consider the worst case where there is a cache miss and the processor is stalled. Both the T1_RIB and extended T2_RIB tables 620 could be put in on-chip memory since they are quite small while the T2_RIB table 620 could be placed in external SRAM. So, in total 16 cycles/lookup are needed, including one for instruction t1_index, 2 for t1_lookup, 1 for t2_addr, 7 for t2_lookup plus 2 cycles for physical memory access to external SRAM, 1 for t3_addr, and 2 for t3_lookup. Since the total table size from the 16/Kc data structure is less than 0.5 MB, it is feasible to put the whole table (T1_RIB, T2_RIB, and extended T2_RIB) in on-chip memory. In this case, there will be no processor stalls and 9 cycles/lookup can be obtained in the worst case. Performing route lookups for 3 packets at the same time similar to the 16/K case mentioned previously, the 3 cycles of memory load latency can be hidden. Moreover, the instructions T1_Index, T2_Addr, and T3_Addr can be embedded into T1_Lookup, t2_lookup and t3_lookup, which will save another 3 cycles. Thus, in the worst case for the 16/Kc scheme, 9−3−3=3 cycles/lookup are needed, which translates to 66 MLPS for an Xtensa processor running at 200 MHz. In the future, the ability to do multiple loads per cycle will scale the performance linearly.

Hardware synthesis for this processor has been performed with the added instructions. It needs about 65K gates for the configured Xtensa core processor (excluding the memory) and an additional 6.5K gates for the added TIE instructions.

The preferred embodiments described above have been presented for purposes of explanation only, and the present invention should not be construed to be so limited. Variations on the present invention will become readily apparent to those skilled in the art after reading this description, and the present invention and appended claims are intended to encompass such variations as well.

APPENDIX A

16/K Route Lookup Algorithm Pseudocode

```
t1_index = ip_addr[31:16]; // get the index to the T1_RIB
t1_entry[31:0] = T1_RIB[t1_index];
if (t1_entry[31] == 1'b0) {
    next_hop = t1_entry[15:6];
}
else {
    K = t1_entry[30:27] + 1; // get K value
    T2_RIB = t1_entry[26:0];
    t2_index = ip_addr[15: 16-K];
    //Load specific T2_RIB entry
    t2_entry[15:0] = T2_RIB[t2_index];
    next_hop = t2_entry[15:6];
}
```

APPENDIX B

16/K Route Update Algorithm Pseudocode

```
if (prefix_length <= 16) {
    prefix = ip_addr >> (32 - prefix_length);
    prefix_diff = 16 - prefix_length; //how many bits shy of 16 is it?
    //Possibly multiple T1_RIB entries are matched, examine all T1_RIB
    //entries within applicable range and update if necessary.
    for (entry = 0; entry < 2^prefix_diff; entry++) {
        t1_index = (prefix << prefix_diff) + entry;
        if (T1_RIB[t1_index] .mark_bit == 0) {
            old_prefix_length = GET_PREFIX_LENGTH(T1_RIB[t1_index]);
            if ( old_prefix_length <= prefix_length) {
                // set it with the new next hop and new prefix length
                T1_RIB[t1_index] = {next_hop,prefix_length};
            }
        } else { // the marker bit is 1
            /* There is at least one route with a prefix length of greater
            than 16 already. Our entry matches all 2nd level entries.
            Change all entries that are less specific. */
            int L2_SIZE = 2^T1_RIB[t1_index] .K;
            T2_RIB = GET_POINTER(T1_RIB[t1_index]);
            for (uj = 0; uj < L2_SIZE; uj++) {
                if ( T2_RIB[uj] .prefix_length <= prefix_length) {
                    /* assign the new next hop and new prefix length */
                    T2_RIB[uj] = {next_hop,prefix_length};
                }
            }
        } // end of else
    } // end of for (entry = 0; ...)
} else { // the prefix length > 16
    new_K = prefix_length - 16;
    prefix = ip_addr[31:16];
    if ( T1_RIB[prefix] .mark_bit == 0) { // the first bit is 0 in T1
        old_T1_entry = T1_RIB[prefix];
        // get a new table, put into T1 and mark the first bit to 1
        NEW_T2_RIB = New T2_RIB with 2^new_K entries
        T1_RIB[prefix] = {mark_bit=1,new_K,Pointer to NEW_T2_RIB};
        //Init table with old NH/PL data from T1_RIB
        for (uj = 0; uj < 2^new_K; uj++) {
            //populate new table with NH/PL data from T1
            NEW_T2_RIB[uj] = NH/PL data from old_T1_entry;
        }
        // Overlay single new NH/PL entry
        new_route_index = ip_addr[15: 16-new_K];
        T2_RIB[new_route_index] = {next_hop,prefix_length};
    } else { // the T1 mark bit is 1
    if (new_K > T1_RIB[prefix] .old_K) {
            // We need a new larger L2 table.
            OLD_T2_RIB = T1_RIB[prefix] .pointer;
            k_diff = new_K - T1_RIB[prefix] .K;
```

APPENDIX B-continued

16/K Route Update Algorithm Pseudocode

```
                //Create new table and link into T1_RIB entry
                NEW_T2_RIB = New T2_RIB with 2^(new_K) entries
                T1_RIB[prefix] = {mark_bit=1,new_K,NEW_T2_RIB};
                //Populate new T2_RIB
                Copy old table to new table replicating each entry in old
                table into 2^(k—diff) entries in the new table.
                //overlay new route
                new_route_index = ip_addr[15: 16–new_K];
                T2_RIB[new_route_index] = {next_hop,prefix_length};
                //delete old table
                free(OLD_T2_RIB);
        } else {
        // Current L2 table is large enough – examine a subset of
        // current table for potential changes.
        T2_RIB = T1_RIB[prefix] .pointer;
        k_diff = (T1_RIB[prefix] .k – new_K);
                for (uj = 0; uj < 2^(k—diff);uj++) {
                    t2_index = (ip_addr[15: 16 – new_K] << k_diff) + uj;
                    if ( T2_RIB[t2_index] .prefix_length <= prefix_length) {
                        // update T2 with new NH and prefix length
                        T2_RIB[t2_index] = {next_hop,prefix_length};
                    }
                }
            }
        }
    }
}
```

APPENDIX C

16/Kc Route Lookup Algorithm Pseudocode

```
t1_index = ip_addr[31:16]; // get the index to the T1_RIB
t1_entry[31:0] = T1_RIB[t1_index];
if (t1_entry[31] == 0) { // marker bit is 0
    next_hop = t1_entry[15:6];
}
else {
    //extract pointer to T2_RIB and K value.
    T2_Entry* p = t1_entry[26:0];
    K = t1_entry[30:27] + 1;
    if (K <= 6) {
        offset1 = 0;
        offset2 = ip_addr[ 15 : 16-K ];
    } else {
        offset1 = ip_addr[ 15 : 16-(K-6)];
        offset2 = ip_addr[ 16-(K-6)-1 : 16-K];
    }
    bmp = p[offset1] .bmp;
    nhpl_or_addr = p[offset1] .nhpl_or_addr;
    all_ones = count_leading_ones(bmp, 63);
    leading_ones = count_leading_ones(bmp, offset2);
    if (all_ones <= 2) {
        if (leading_ones == 1)
                nhpl = nhpl_or_addr[63 : 48]; // get nhpl1
        else
                nhpl = nhpl_or_addr[47 : 32]; // get nhpl2
    } else { // nhpl_or_addr is an address
        nhpl = nhpl_or_addr[leading_ones – 1];
    }
    next_hop = GET_NEXT_HOP(nhpl);
}
```

APPENDIX D

16/Kc Route Update Algorithm Pseudocode

```
if (prefix_length <= 16) {
    //change a subset of the L1 entries.
    foreach (matched T1_RIB entry) {
        if (T1_RIB[t1_index_of_match] .mark_bit == 0) {
            [UPDATE_NHPL_DATA of T1_RIB entry if more specific]
        } else {
```

APPENDIX D-continued

16/Kc Route Update Algorithm Pseudocode

```
                //Entry matches entire T2_RIB
                [UPDATE_NHPL_ARRAY of entire T2_RIB for each less specific entry]
            }
        }
    } else { // end of if (prefix_length <= 16)
        //Only 1 matching T1 entry. A subset of T2 needs modification
        t1_index_of_match = ip_addr[31:16];
        new_K = 16 - prefix length;
        old_K = T1_RIB[t1_index_of_match] .K;
        if (T1_RIB[t1_index_of_match] .markbit==0) {
            [Create a new T2_RIB with MAX(1,2^new_K-6) entries]
            [Set bitmaps in T2_RIB to 0x8000000000000000LL]
            [Populate T2_RIB with T1_RIB's next_hop/prefix_length data]
            [Overlay new route into T2_RIB at appropriate position, changing the bitmap
and storing data into the nhpl array]
            //update T1_RIB to point to T2_RIB;
            T1_RIB[t1_index_of_match] = {mark_bit=1,new_K,T2_RIB base pointer};
        } else { // prefix_length > 16, mark bit == 1
            if (new_k <= old_K) {
                if (T1_RIB[t1_index_of_match] .K <= 6) {
                    //Only 1 T2_RIB entry.
                    [Update a subset of T2_RIB_entry bitmap with new route where more
specific]
                    [update nhpl where the new route is more specific]
                } else { //old_K > 6
                    //Multiple (2^old_K-6) T2_RIB entries
                    off1 = ip_addr[15:16-(old_K-6)];
                    off2 = ip_addr[15-(old_K-6):10-(old_K-6)];
                    if (new_K <= old_K - 6) {
                        //New route matches multiple entries in the T2_RIB
                        foreach (Matched entry in the T2_RIB) {
                            [Update nexthop/prefix_length array if this route is more
specific]
                            //No need to update bmp.
                        }
                    } else {
                        // matched only 1 entry in T2_RIB
                        [Update subset of T2_RIB_entry bitmap with new route where more
specific]
                        [update subset of nhpl where the new route is more specific]
                    }
                }
            } else { // new_K > old_K
                if (new_K <= 6) {
                    // only 1 matched T2_RIB entry
                    [Keep the same T2_RIB entry, but grow the bitmap]
                    [overlay new entry into bitmap and next_hop/prefix_length array if
it is more specific]
                    //update K value in T2_RIB entry
                    T1_RIB[t1_index_of_match] = {mark_bit=1,new_K,T2_RIB};
                } else { //new_K > 6
                    [Create a new T2_RIB with MAX(1,2^new_K-6) entries]
                    if (new_K - old_K < 6) {
                        // each bit is expanding into a fragment of a bmp.
                        [Copy from old T2_RIB to new T2_RIB expanding each bit into a
bitmap fragment of length 2^new_K-old_K bits]
                    } else { //new_K - old_K >= 6
                        // each bit is expanding into entire bmps.
                        [Copy from old T2_RIB to new T2_RIB expanding each bit into
2^new_K-old_K-6 entries]
                    }
                    //update specific entry
                    [Overlay new route into T2_RIB at appropriate position, changing
the bitmap and storing data into the nhpl array]
                    //update t1 entry's k and ptr
                    T1_RIB[t1_index_of_match] = {mark_bit=1,new_K,T2_RIB};
                    //free old Table
                    free(OLD_T2_RIB);
                }
            }
        }
    }
}
```

What is claimed is:

1. A method of routing a packet by performing a route lookup based on a received IP destination address, the method comprising:

configuring a first lookup table having at least one entry, each of the at least one entry having a bitmap portion and an information storage portion;

configuring a second lookup table having at least one entry, each entry in the at least one entry storing next hop and prefix length information;

configuring a third lookup table having at least one entry, the at least one entry including a pointer portion and a variable value K; and routing a packet having the received IP destination address using the first, second and third lookup tables, wherein the configuring steps are performed such that each at least one entry of the third lookup table is indexable by a segment portion of the IP destination address, and wherein when there is a route having a prefix matching the index of the at least one entry and a prefix length greater than a predetermined value, the pointer portion includes a pointer that is combined with K bits of the IP destination address following the segment portion to determine an index for the at least one entry in the first lookup table, wherein bits within the bitmap of the at least one entry are indexable by a second portion of the IP destination address, the information storage portion of each of the at least one entry stores next hop and prefix information when the total number of ones in the bitmap of the at least one entry is one of a given set of values, and the information storage portion of each of the at least one entry information pointing to an entry in the second lookup table when the total number of ones in the bitmap of the at least one entry is not one of the given set of values.

2. The method of claim 1, wherein the first set of values includes one and two.

3. The method of claim 2, wherein the configuring steps are performed such that:

the information storage portion of the at least one entry stores one set of next hop and prefix length information when the total number of ones in the bitmap of the at least one entry is one;

the information storage portion of the at least one entry stores two sets of next hop and prefix length information when the total number of ones in the bitmap of the at least one entry is two; and the information storage portion of the at least one entry stores information pointing to an entry in the second lookup table when the total number of ones in the bitmap of the at least one entry is more than two.

4. A method according to claim 1, wherein the configuring steps further include:

determining for each entry in a group of entries in the lookup tables, whether a value of the entry is different from a value of a previous entry, when the entry value is different from the previous entry value, storing a first bit value in a corresponding place in a bitmap corresponding to that group of entries; and when the entry value is the same as a previous entry value, storing a second bit value different from the first bit value in the corresponding place;

when a number of ones in the bitmap is in a first set of values, storing next hop and prefix length information in an entry storing the bitmap, the next hop and prefix length information corresponding to entries in the bitmap; and when a number of ones in the bitmap is in a second set of values, storing an index to next hop and prefix length information corresponding to the bitmap information stored in a second data structure in the entry storing the bitmap.

5. The method of claim 1, wherein K is less than a total number of bits of the IP destination address less a number of bits comprising the segment portion.

6. A method of routing packets including updating a data structure suitable for use in a route lookup system in a communications network, the method comprising:

routing packets using the data structure;

receiving an IP route having an IP address component, prefix length component and next hop component;

checking a group of entries in the data structure indicated by the prefix length component, the group having a size determined by a length of the IP address less the prefix length;

performing a longest match procedure to update the group of entries to have most specific next hop and prefix length information for the group of entries, wherein updating includes determining and storing a variable value K in the data structure, and further including storing next hop and prefix information for certain of the updated group of entries entirely within a $2^K$ block of entries in another data structure;

wherein checking includes determining whether a given portion of an entry in the group of entries stores next hop and prefix information, or stores an index to a block of next hop and prefix information in the another data structure; and obtaining prefix length and next hop information for the entry based on the determination result; and routing packets using the updated data structure and the another data structure.

* * * * *